(12) United States Patent
Singh et al.

(10) Patent No.: US 12,507,230 B2
(45) Date of Patent: Dec. 23, 2025

(54) CONTROL MESSAGE WITH SYMBOL MASK

(71) Applicant: QUALCOMM Incorporated, San Diego, CA (US)

(72) Inventors: Tushar Singh, Hyderabad (IN); Sudeepta Kumar Nath, Sambalpur (IN); Anil Kumar Devpura, Hyderabad (IN); Satish Kumar, Hyderabad (IN); Loksiva Paruchuri, Hyderabad (IN); Ashok Tripathi, Pragathi Enclave (IN)

(73) Assignee: QUALCOMM Incorporated, San Diego, CA (US)

( * ) Notice: Subject to any disclaimer, the term of this patent is extended or adjusted under 35 U.S.C. 154(b) by 251 days.

(21) Appl. No.: 17/928,707

(22) PCT Filed: Jul. 12, 2021

(86) PCT No.: PCT/US2021/041308
§ 371 (c)(1),
(2) Date: Nov. 30, 2022

(87) PCT Pub. No.: WO2022/015659
PCT Pub. Date: Jan. 20, 2022

(65) Prior Publication Data
US 2023/0328712 A1 Oct. 12, 2023

(30) Foreign Application Priority Data

Jul. 13, 2020 (IN) .............................. 202041029663

(51) Int. Cl.
*H04W 72/1263* (2023.01)
*H04L 27/18* (2006.01)
*H04L 27/34* (2006.01)

(52) U.S. Cl.
CPC ......... *H04W 72/1263* (2013.01); *H04L 27/18* (2013.01); *H04L 27/34* (2013.01)

(58) Field of Classification Search
None
See application file for complete search history.

(56) References Cited

U.S. PATENT DOCUMENTS

| 10,009,832 | B1 | 6/2018 | Wang et al. |
| 2019/0150142 | A1* | 5/2019 | Huang .................. H04L 5/0094 370/336 |

(Continued)

FOREIGN PATENT DOCUMENTS

| CN | 109379782 A | 2/2019 |
| CN | 109565861 A | 4/2019 |

(Continued)

OTHER PUBLICATIONS

International Search Report and Written Opinion—PCT/US2021/041308—ISA/EPO—Oct. 29, 2021.

*Primary Examiner* — Anh Vu H Ly
(74) *Attorney, Agent, or Firm* — Guang Y. Zhang; Loza & Loza LLP

(57) ABSTRACT

Aspects relate to a control message that includes at least one symbol mask to be applied to a set of symbols of a time slot. In some examples, the control message may also include at least one resource element mask to be applied to at least one resource element of the time slot. In some aspects, information may be communicated during the time slot according to the at least one symbol mask.

28 Claims, 30 Drawing Sheets

(56) References Cited

U.S. PATENT DOCUMENTS

| | | | |
|---|---|---|---|
| 2019/0261337 A1* | 8/2019 | Park | H04L 5/0094 |
| 2019/0357224 A1* | 11/2019 | Li | H04L 5/0055 |
| 2020/0221463 A1* | 7/2020 | Wang | H04W 72/53 |
| 2021/0045122 A1* | 2/2021 | Shi | H04L 27/2602 |
| 2022/0095304 A1* | 3/2022 | Muruganathan | H04W 72/0453 |
| 2022/0174677 A1* | 6/2022 | Bi | H04W 28/26 |

FOREIGN PATENT DOCUMENTS

| | | |
|---|---|---|
| CN | 109600839 A | 4/2019 |
| WO | WO-2020109892 A1 | 6/2020 |

\* cited by examiner

FIG. 7

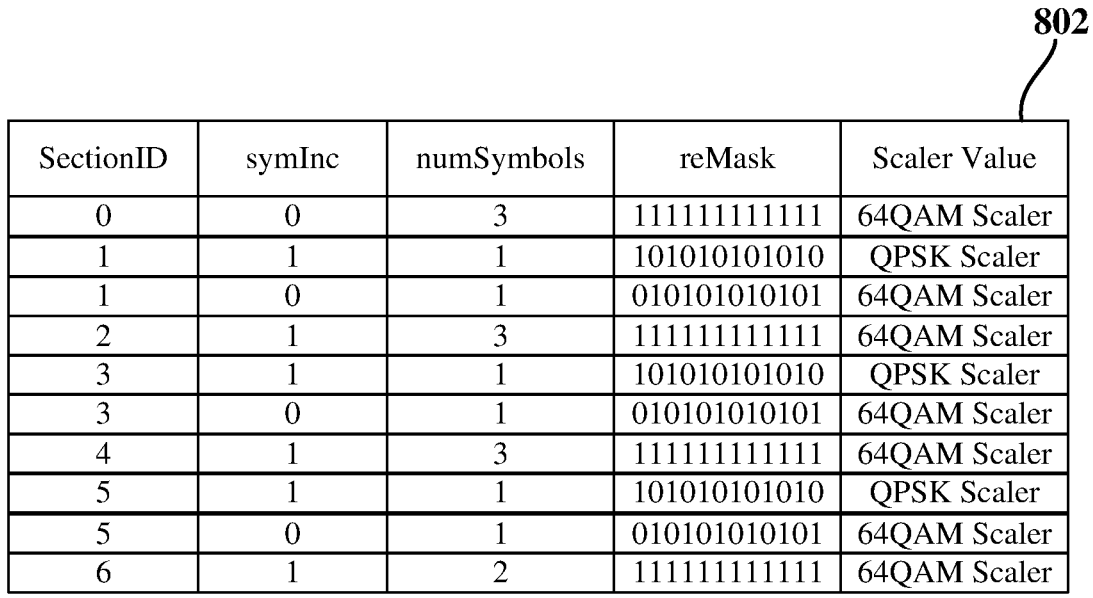
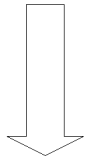
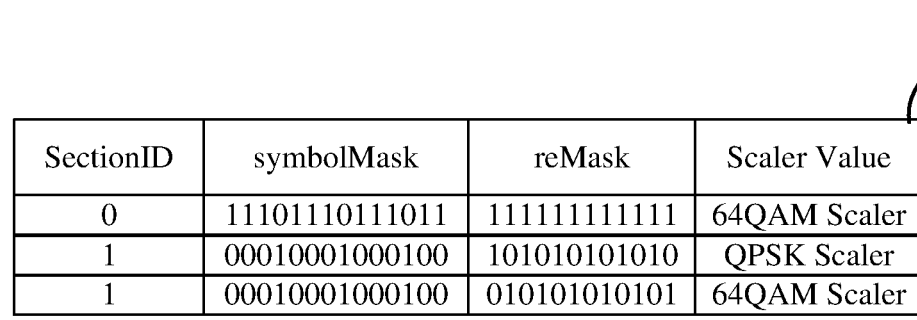
FIG. 8

1002

| SectionID | symInc | numSymbols | reMask | Scaler Value |
|---|---|---|---|---|
| 0 | 0 | 1 | 110111111111 | 64QAM Scaler |
| 0 | 0 | 1 | 001000000000 | QPSK Scaler |
| 1 | 1 | 1 | 111111111111 | 64QAM Scaler |
| 2 | 1 | 1 | 110111111111 | 64QAM Scaler |
| 2 | 0 | 1 | 001000000000 | QPSK Scaler |
| 3 | 1 | 1 | 010101010101 | 64QAM Scaler |
| 3 | 0 | 1 | 101010101010 | QPSK Scaler |
| 4 | 1 | 1 | 111111111111 | 64QAM Scaler |
| 5 | 1 | 1 | 110111111111 | 64QAM Scaler |
| 5 | 0 | 1 | 001000000000 | QPSK Scaler |
| 6 | 1 | 1 | 111111111111 | 64QAM Scaler |
| 7 | 1 | 1 | 010101010101 | 64QAM Scaler |
| 7 | 0 | 1 | 101010101010 | QPSK Scaler |
| 8 | 1 | 1 | 111111111111 | 64QAM Scaler |
| 9 | 1 | 1 | 110111111111 | 64QAM Scaler |
| 9 | 0 | 1 | 001000000000 | QPSK Scaler |
| 10 | 1 | 1 | 111111111111 | 64QAM Scaler |
| 11 | 1 | 1 | 010101010101 | 64QAM Scaler |
| 11 | 0 | 1 | 101010101010 | QPSK Scaler |
| 12 | 1 | 1 | 111111111111 | 64QAM Scaler |
| 13 | 1 | 1 | 110111111111 | 64QAM Scaler |
| 13 | 0 | 1 | 001000000000 | QSPK Scaler |

⬇

1004

| SectionID | symbolMask | reMask | Scaler Value |
|---|---|---|---|
| 0 | 01001010101010 | 111111111111 | 64QAM Scaler |
| 1 | 00010001000100 | 010101010101 | 64QAM Scaler |
| 1 | 00010001000100 | 101010101010 | QPSK Scaler |
| 2 | 10100100010001 | 110111111111 | 64QAM Scaler |
| 2 | 10100100010001 | 001000000000 | QPSK Scaler |

| SectionID | symInc | numSymbols | reMask | Scaler Value |
|---|---|---|---|---|
| 0 | 0 | 1 | 110111111111 | 64QAM Scaler |
| 0 | 0 | 1 | 001000000000 | QPSK Scaler |
| 1 | 1 | 1 | 111111111111 | 64QAM Scaler |
| 2 | 1 | 1 | 110111111111 | 64QAM Scaler |
| 2 | 0 | 1 | 001000000000 | QPSK Scaler |
| 3 | 1 | 1 | 010101010101 | 64QAM Scaler |
| 3 | 0 | 1 | 101010101010 | QPSK Scaler |
| 4 | 1 | 1 | 111111111111 | 64QAM Scaler |
| 5 | 1 | 1 | 110111111111 | 64QAM Scaler |
| 5 | 0 | 1 | 001000000000 | QPSK Scaler |
| 6 | 1 | 1 | 111111111111 | 64QAM Scaler |
| 7 | 1 | 1 | 010101010101 | 64QAM Scaler |
| 7 | 0 | 1 | 101010101010 | QPSK Scaler |
| 8 | 1 | 1 | 111111111111 | 64QAM Scaler |
| 9 | 1 | 1 | 110111111111 | 64QAM Scaler |
| 9 | 0 | 1 | 001000000000 | QPSK Scaler |
| 10 | 1 | 1 | 111111111111 | 64QAM Scaler |
| 11 | 1 | 1 | 010101010101 | 64QAM Scaler |
| 11 | 0 | 1 | 101010101010 | QPSK Scaler |
| 12 | 1 | 1 | 111111111111 | 64QAM Scaler |
| 13 | 1 | 1 | 010101110111 | 64QAM Scaler |
| 13 | 0 | 1 | 001000000000 | QSPK Scaler |
| 13 | 0 | 1 | 100010001000 | QSPK Scaler |

1204

| SectionID | symbolMask | reMask | Scaler Value |
|---|---|---|---|
| 0 | 01001010101010 | 111111111111 | 64QAM Scaler |
| 1 | 00010001000100 | 010101010101 | 64QAM Scaler |
| 1 | 00010001000100 | 101010101010 | QPSK Scaler |
| 2 | 10100100010000 | 110111111111 | 64QAM Scaler |
| 2 | 10100100010001 | 001000000000 | QPSK Scaler |
| 3 | 00000000000001 | 010101110111 | 64QAM Scaler |
| 3 | 00000000000001 | 100010001000 | QPSK Scaler |

FIG. 12

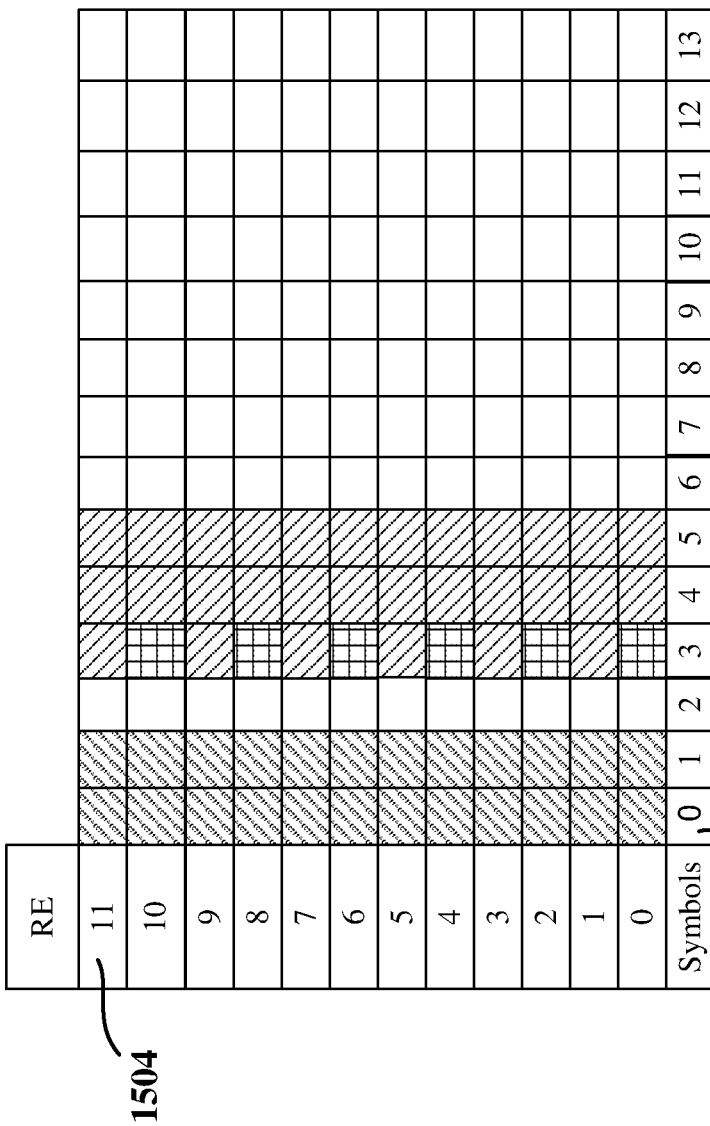
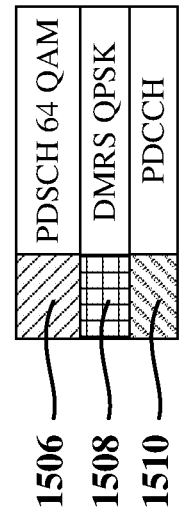
FIG. 15

CONTROL MESSAGE WITH SYMBOL MASK

CROSS-REFERENCE TO RELATED APPLICATIONS

This application is the U.S. national stage of PCT patent application number PCT/US2021/041308 filed on Jul. 12, 2021, which claims priority to and the benefit of pending India Provisional Patent Application No. 20/204,1029663 filed on Jul. 13, 2020, and assigned to the assignee hereof and hereby expressly incorporated by reference herein as if fully set forth below in its entirety and for all applicable purposes.

TECHNICAL FIELD

The technology discussed below relates generally to wireless communication networks and, more particularly, to a control message that includes at least one symbol mask.

INTRODUCTION

Next-generation wireless communication systems (e.g., 5GS) may include a 5G core network and a 5G radio access network (RAN), such as a New Radio (NR)-RAN. The NR-RAN supports communication via one or more cells. For example, a wireless communication device such as a user equipment (UE) may access a first cell of another wireless communication device such as a first base station (e.g., a gNB) and/or access a second cell of a second base station.

A base station may schedule access to a cell to support access by multiple UEs. For example, a base station may allocate different resources (e.g., time domain and frequency domain resources) for different UEs operating within a cell of the base station. A UE may therefore transmit data to the base station via one or more of these allocated resources. In addition, a UE may receive data transmitted by the base station via one or more of these allocated resources.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, a method for communication at a scheduling entity is disclosed. The method may include transmitting an indication of a time slot to a radio unit and transmitting to the radio unit a control message including at least one symbol mask for at least one symbol of the time slot and at least one resource element mask for at least one resource element of the time slot.

In some examples, a scheduling entity may include a transceiver, a memory, and a processor coupled to the transceiver and the memory. The processor and the memory may be configured to transmit an indication of a time slot to a radio unit via the transceiver and transmit a control message including at least one symbol mask for at least one symbol of the time slot and at least one resource element mask for at least one resource element of the time slot to the radio unit via the transceiver.

In some examples, a scheduling entity may include means for transmitting an indication of a time slot to a radio unit and means for transmitting to the radio unit a control message including at least one symbol mask for at least one symbol of the time slot and at least one resource element mask for at least one resource element of the time slot.

In some examples, an article of manufacture for use by a scheduling entity includes a non-transitory computer-readable medium having stored therein instructions executable by one or more processors of the scheduling entity to transmit an indication of a time slot to a radio unit and transmit a control message including at least one symbol mask for at least one symbol of the time slot and at least one resource element mask for at least one resource element of the time slot to the radio unit.

In some examples, a method for communication at a radio unit is disclosed. The method may include receiving a control message including at least one symbol mask for at least one symbol of a time slot and at least one resource element mask for at least one resource element of the time slot, and communicating information during the time slot. In some aspects, the information may be communicated according to the at least one symbol mask.

In some examples, a radio unit may include a transceiver, a memory, and a processor coupled to the transceiver and the memory. The processor and the memory may be configured to receive a control message via the transceiver. The control message including at least one symbol mask for at least one symbol of a time slot and at least one resource element mask for at least one resource element of the time slot. The processor and the memory may also be configured to communicate information via the transceiver during the time slot. In some aspects, the information may be communicated according to the at least one symbol mask.

In some examples, a radio unit may include means for receiving a control message including at least one symbol mask for at least one symbol of a time slot and at least one resource element mask for at least one resource element of the time slot, and means for communicating information during the time slot. In some aspects, the information may be communicated according to the at least one symbol mask.

In some examples, an article of manufacture for use by a radio unit includes a non-transitory computer-readable medium having stored therein instructions executable by one or more processors of the radio unit to receive a control message including at least one symbol mask for at least one symbol of a time slot and at least one resource element mask for at least one resource element of the time slot, and communicate information during the time slot. In some aspects, the information may be communicated according to the at least one symbol mask.

These and other aspects of the disclosure will become more fully understood upon a review of the detailed description, which follows. Other aspects, features, and examples of the present disclosure will become apparent to those of ordinary skill in the art, upon reviewing the following description of specific, example aspects of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while example aspects may be discussed below as device, system, or method examples it should be understood that such example aspects can be implemented in various devices, systems, and methods.

BRIEF DESCRIPTION OF THE DRAWINGS

FIG. 7 is a diagram illustrating a first example of a time slot according to some aspects.

FIG. 8 is a diagram illustrating a first example of a control plane message that includes a symbol mask according to some aspects.

FIG. 10 is a diagram illustrating a second example of a control plane message that includes a symbol mask according to some aspects.

FIG. 12 is a diagram illustrating a third example of a control plane message that includes a symbol mask according to some aspects.

FIG. 15 is a diagram illustrating a fifth example of a time slot according to some aspects.

DETAILED DESCRIPTION

Figure 1:
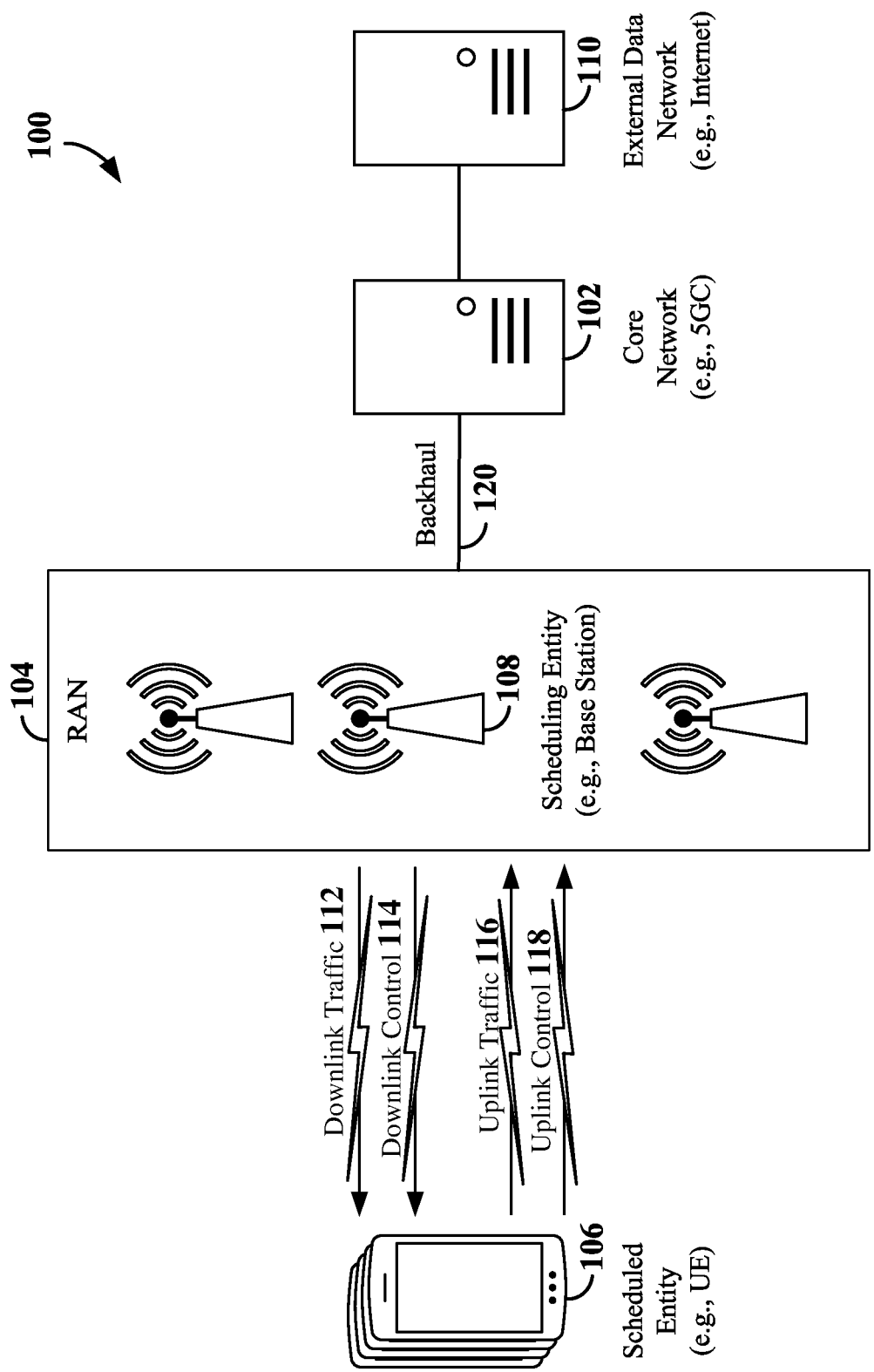
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence-enabled (AI-enabled) devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, end-user devices, etc., of varying sizes, shapes, and constitution.

The disclosure relates in some aspects to a control message (which also may be referred to as a control plane message) that includes at least one symbol mask. For example, a control plane message between a distributed unit (DU) and a radio unit (RU) of an ORAN may include a symbol mask to identify symbols in a time slot (which may be referred to herein as a slot) allocated for a user.

In some examples, a symbol mask indicates a modulation parameter (e.g., a modulation compression parameter) to be applied to a set of symbols of a time slot. For example, a first symbol mask of a control plane message may specify a first modulation scaler value (e.g., a modulation scaler indicating 64 QAM) for a first set of symbols and a second symbol mask of the control plane message may specify a second modulation scaler value (e.g., a modulation scaler indicating quadrature phase shift keying (QPSK) modulation) for a second set of symbols. In some aspects, the use of such a symbol mask may reduce the overhead associated with control plane messages.

In some examples, a symbol mask indicates a symbol allocation within a continuous (e.g., contiguous) set of resource blocks of a time slot. For example, a first symbol mask of a control plane message may specify the symbols for a first allocation (e.g., for user data signals) and a second symbol mask of the control plane message may specify the symbols for a second allocation (e.g., for reference signals). In some aspects, the use of such a symbol mask may reduce the overhead associated with control plane messages.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. In another example, the RAN 104 may operate according to both the LTE and 5G NR standards. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations 108 may be an LTE base station, while another base station may be a 5G NR base station.

The radio access network 104 is further illustrated supporting wireless communication for multiple mobile apparatuses. A mobile apparatus may be referred to as user equipment (UE) 106 in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE 106 may be an apparatus that provides a user with access to network services. In examples where the RAN 104 operates according to both the LTE and 5G NR standards, the UE 106 may be an Evolved-Universal Terrestrial Radio Access Network—New Radio dual connectivity (EN-DC) UE that is capable of simultaneously connecting to an LTE base station and a NR base station to receive data packets from both the LTE base station and the NR base station.

Within the present document, a mobile apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an Internet of Things (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In some examples, the term downlink may refer to a point-to-multipoint transmission originating at a base station (e.g., base station 108). Another way to describe this point-to-multipoint transmission scheme may be to use the term broadcast channel multiplexing. Transmissions from a UE (e.g., UE 106) to a base station (e.g., base station 108) may be referred to as uplink (UL) transmissions. In some examples, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate with other UEs in a peer-to-peer or device-to-device fashion and/or in a relay configuration.

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 and/or uplink control information 118 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols in some examples. A subframe may refer to a duration of 1 millisecond (ms). Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
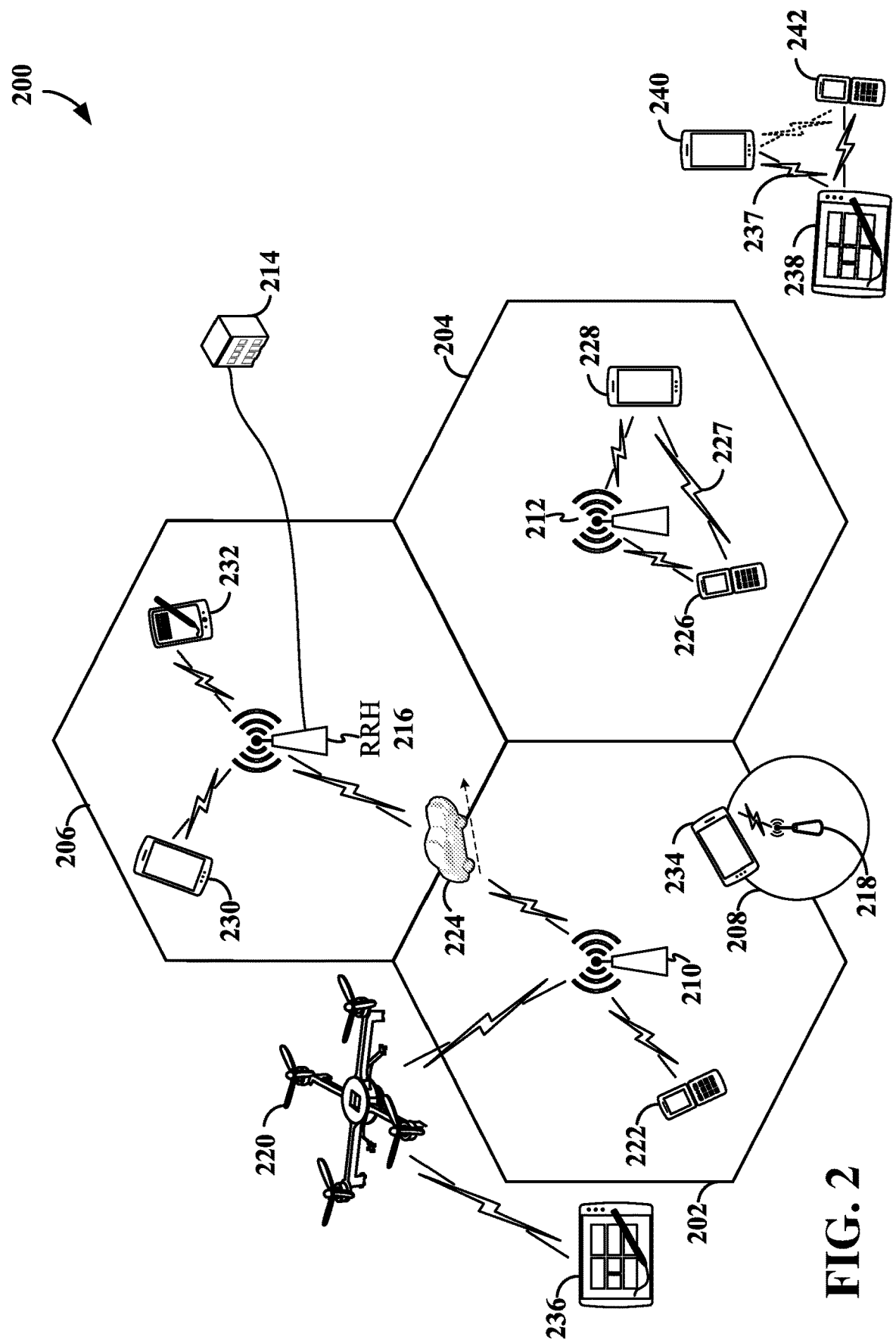
FIG. 2 is a conceptual illustration of an example of a radio access network according to some aspects.

Referring now to FIG. 2, by way of example and without limitation, a schematic illustration of a radio access network (RAN) 200 is provided. In some examples, the radio access network 200 may be the same as the RAN 104 described above and illustrated in FIG. 1.

The geographic area covered by the radio access network 200 may be divided into cellular regions (cells) that can be uniquely identified by a user equipment (UE) based on an identification broadcasted from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the radio access network 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 236, 238, 240, and/or 242 may be the same as the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the radio access network 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of the serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the radio access network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without the need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple radio access technologies (RATs). For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full-duplex (FD) means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancelation technologies. Full-duplex emulation is frequently implemented for wireless links by utilizing frequency division duplex (FDD) or spatial division duplex (SDD). In FDD, transmissions in different directions operate at different carrier frequencies. In SDD, transmissions in different directions on a given channel are separate from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to as sub-band full-duplex (SBFD), also known as flexible duplex.

Figure 3:
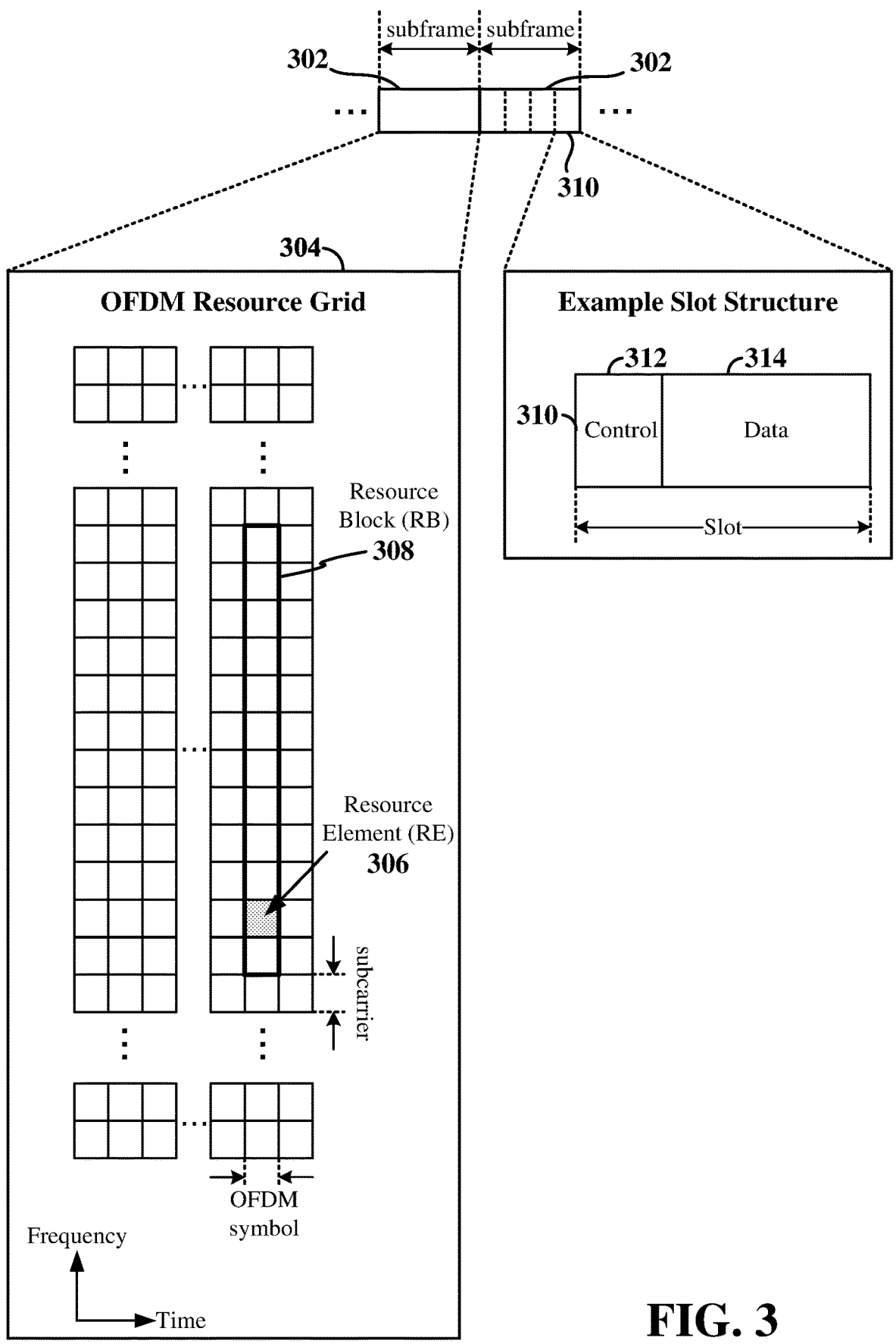
FIG. 3 is a schematic diagram illustrating organization of wireless resources in an air interface utilizing orthogonal frequency divisional multiplexing (OFDM) according to some aspects.

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 3, an expanded view of an example subframe 302 is illustrated, showing an OFDM resource grid. However, as those skilled in the art will readily appreciate, the physical (PHY) layer transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more REs 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely an example, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional (remaining) system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., an Rx V2X device or some other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

In some examples, an open radio access network (ORAN) architecture may be based on 3GPP technology (e.g., 5G and/or LTE) as discussed above. An ORAN may employ open interfaces that enable vendors and operators to introduce their own services or customize the network to suit their own unique needs. For example, an ORAN may employ virtualized network elements, white-box (e.g., open architecture) hardware, and standardized interfaces that support network intelligence and open interfaces. In some aspects, an ORAN may be self-driving and able to leverage new learning-based technologies to automate operational network functions.

In some examples, an ORAN may employ a distributed and flexible baseband architecture where the functionality of a network node (e.g., incorporating modem functionality) may be split among one or more control units and one or more distributed units (which may also be referred to as data units). For example, a network node may include multiple control units, each of which supports multiple distributed units. Each distributed unit may, in turn, support one or more radio units. A control unit, a distributed unit, and a radio unit provide different communication protocol layer functionality and other related functionality.

Figure 4:
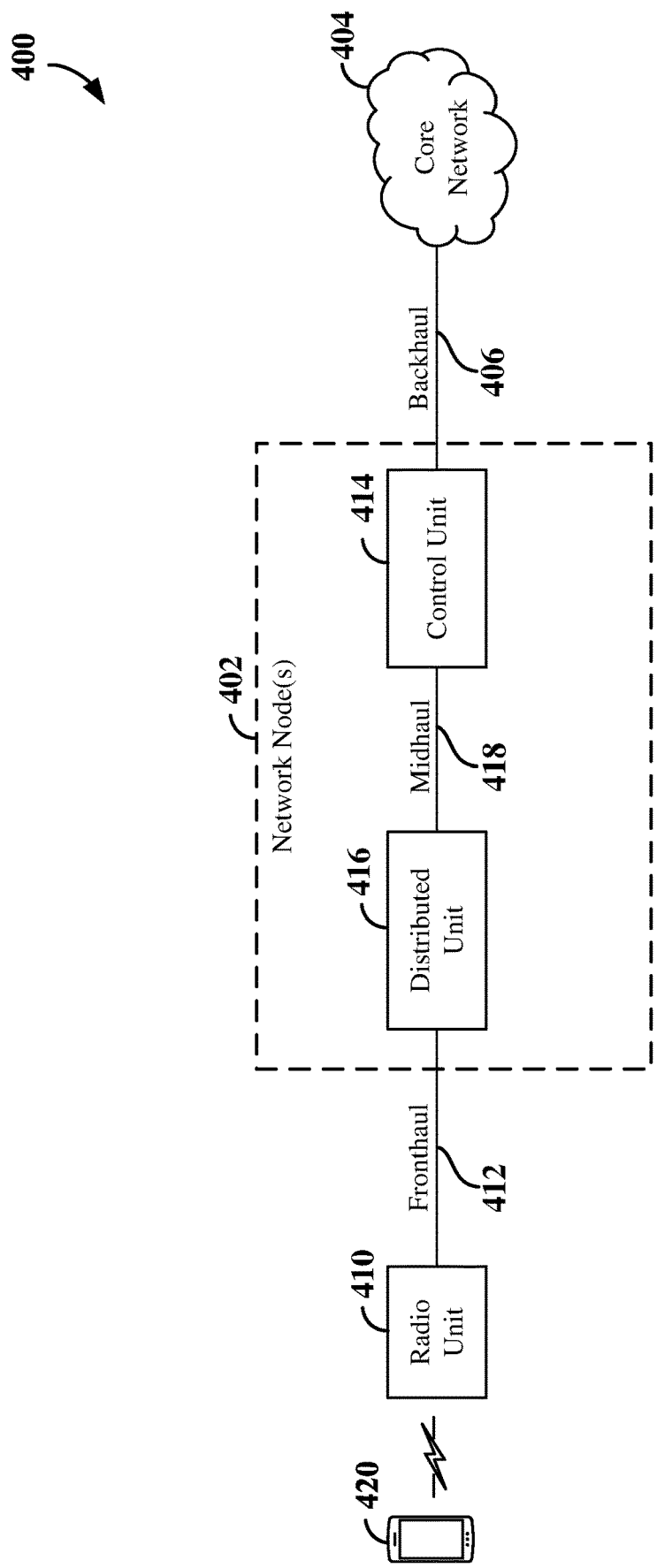
FIG. 4 is a block diagram illustrating an example of an open radio access network (ORAN) according to some aspects.

For example, FIG. 4 is a block diagram illustrating an example of several components of an ORAN 400 according to some aspects. In practice, the ORAN 400 will include other components as well. A network node 402 communicates with a core network 404 via a backhaul link 406 and communicates with at least one radio unit 410 via at least one fronthaul link 412. The network node 402 includes at least one control unit 414 and at least one distributed unit 416 that communicate via at least one midhaul link 418. Each radio unit 410 communicates with at least one UE 420 via RF signaling. In some implementations, the distributed unit 416 may correspond to any of the DUs shown in any of FIGS. 5, 6, and 22. In some implementations, the radio unit 410 may correspond to any of the RUs shown in any of FIGS. 5, 6, and 22.

In some examples, a control unit is a logical node that hosts a packet data convergence protocol (PDCP) layer, a radio resource control (RRC) layer, a service data adaptation protocol (SDAP) layer and other control functions. A control unit may also terminate interfaces (e.g., an E1 interface, an E2 interface, etc., not shown in FIG. 4) to network nodes (e.g., nodes of a core network). In addition, an F1 interface (not shown in FIG. 4) may provide a mechanism to interconnect a control unit (e.g., the PDCP layer and higher layers) and a distributed unit (e.g., the radio link control (RLC) layer and lower layers). In some aspects, an F1 interface may provide control plane and user plane functions (e.g., interface management, system information management, UE context management, RRC message transfer, etc.). For example, the F1 interface may support F1-C on the control plane and F1-U on the user plane. FLAP is an application protocol for F1 that defines signaling procedures for F1 in some examples.

In some examples, a distributed unit is a logical node that hosts an RLC layer, a medium access control (MAC) layer, and a high physical (PHY) layer based on a lower layer functional split (LLS). In some aspects, a distributed unit may control the operation of at least one radio unit. A distributed unit may also terminate interfaces (e.g., F1, E2, etc.) to the control unit and/or other network nodes. In some examples, a high PHY layer includes portions of the PHY processing such as forward error correction 1 (FEC 1) encoding and decoding, scrambling, modulation, and demodulation.

In some examples, a radio unit is a logical node that hosts low PHY layer and radio frequency (RF) processing based on a lower layer functional split. In some examples, a radio unit may be similar to a 3GPP transmit receive point (TRP) or remote radio head (RRH), while also including the low PHY layer. In some examples, a low PHY layer includes portions of the PHY processing such as fast Fourier transform (FFT), inverse 141-T (iFFT), digital beamforming, and physical random access channel (PRACH) extraction and filtering. The radio unit may also include a radio chain for communicating with one or more UEs.

Figure 5:
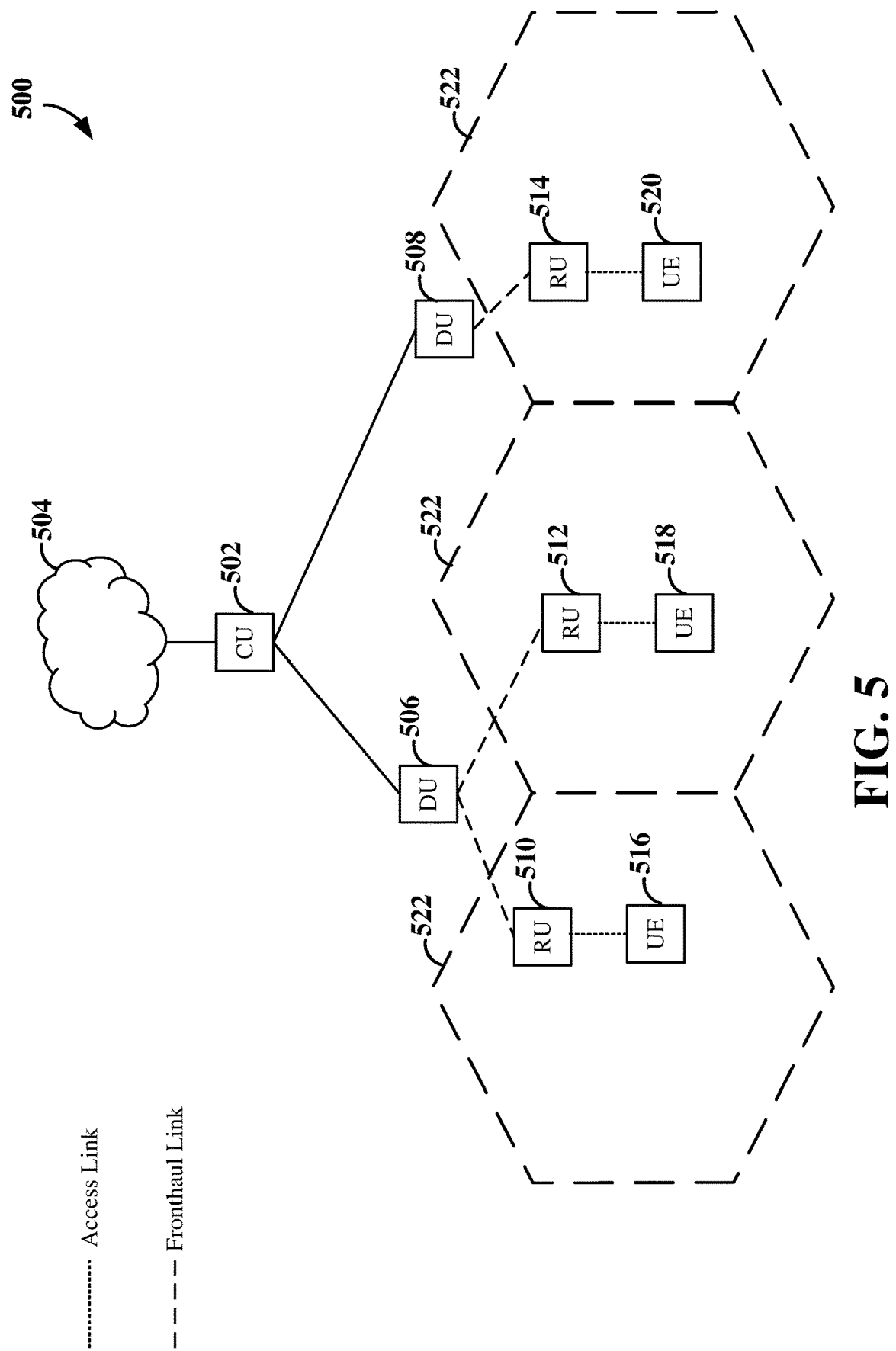
FIG. 5 is a diagram illustrating another example of an ORAN according to some aspects.

FIG. 5 is a diagram illustrating an example of the distributed nature of an ORAN 500 according to some aspects. The ORAN 500 may be similar to the radio access network 200 shown in FIG. 2, in that the ORAN 500 may be divided into a number of cells (e.g., cells 522) each of which may be served by respective network nodes (e.g., control units, distributed units, and radio units). The network nodes may constitute access points, base stations (BSs), eNBs, gNBs, or other nodes that utilize wireless spectrum (e.g., the radio frequency (RF) spectrum) and/or other communication links to support access for one or more UEs located within the cells.

Figure 6:
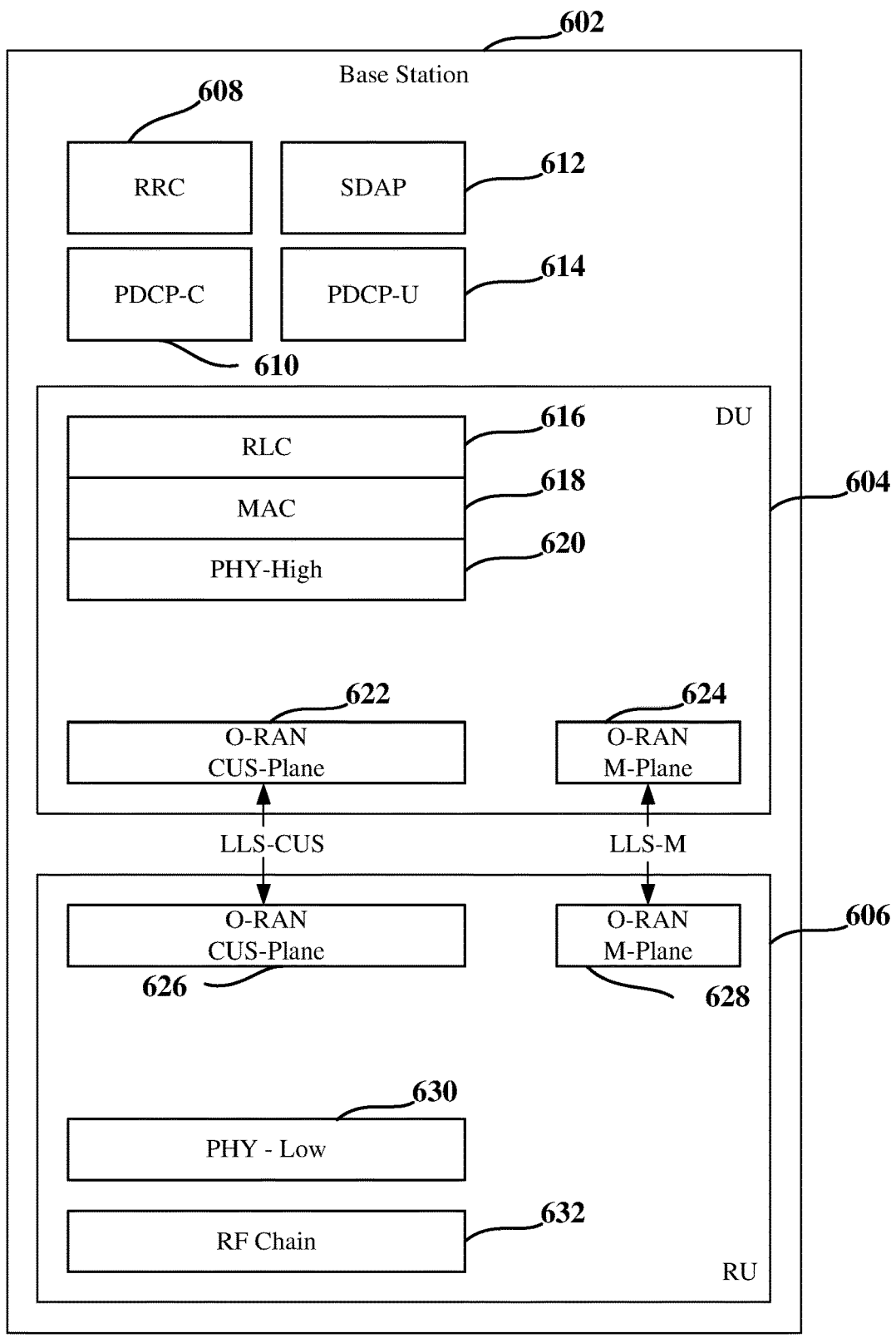
FIG. 6 is a diagram illustrating an example of fronthaul communication between a distributed unit and a radio unit according to some aspects.
Figure 22:
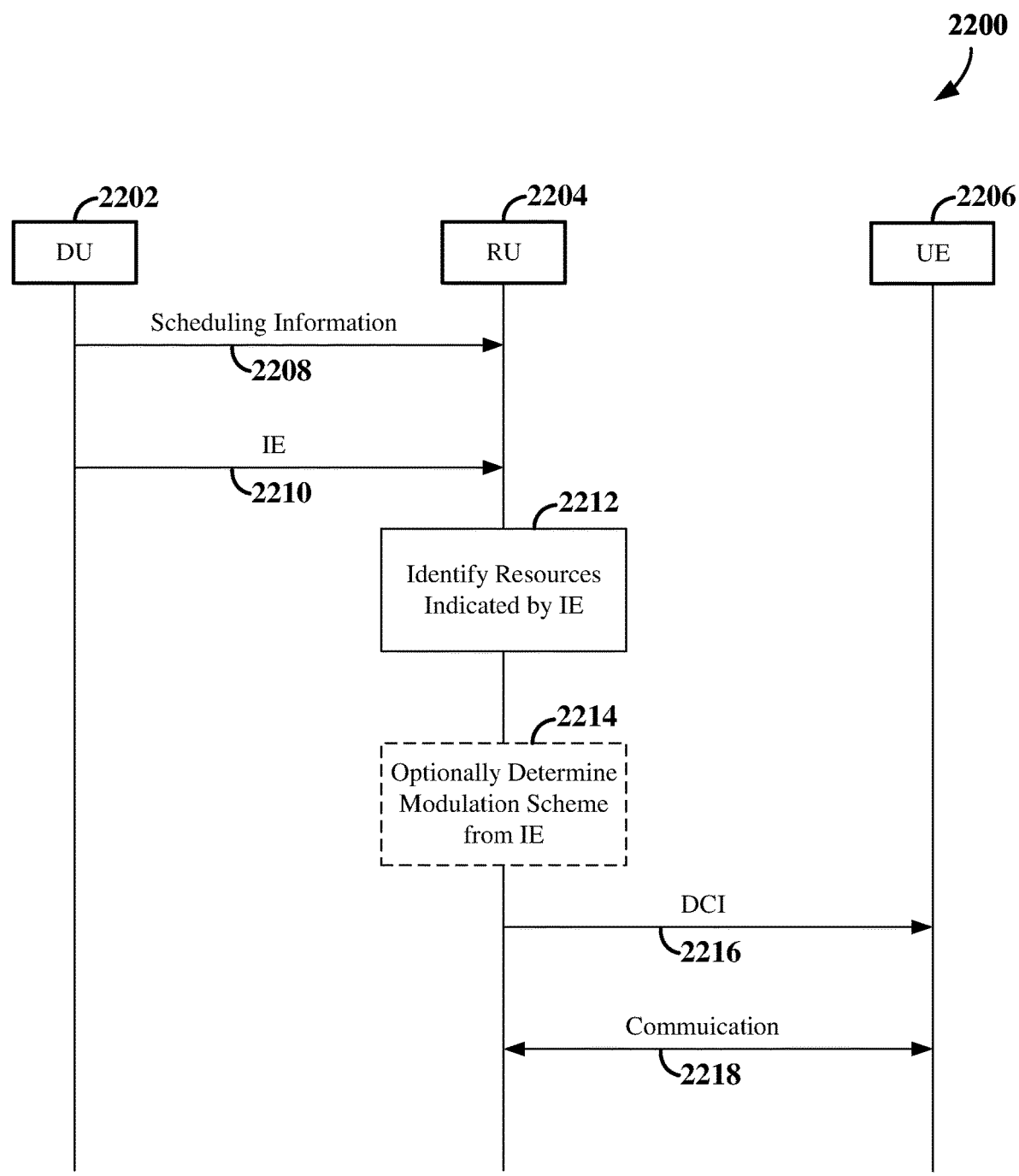
FIG. 22 is a signaling diagram illustrating an example of control plane signaling according to some aspects.

In the example of FIG. 5, a control unit (CU) 502 communicates with a core network 504 via a backhaul link, and communicates with a first distributed unit (DU) 506 and a second distributed unit 508 via respective midhaul links The first distributed unit 506 communicates with a first radio unit (RU) 510 and a second radio unit 512 via respective fronthaul links The second distributed unit 508 communicates with a third radio unit 514 via a fronthaul link The first radio unit 510 communicates with at least one UE 516 via at least one RF access link The second radio unit 512 communicates with at least one UE 518 via at least one RF access link The third radio unit 514 communicates with at least one UE 520 via at least one RF access link In some implementations, the distributed units 506 and 508 may correspond to any of the DUs shown in any of FIGS. 4, 6, and 22. In some implementations, the radio units 510, 512, and 514 may correspond to any of the RUs shown in any of FIGS. 4, 6, and 22.

FIG. 6 is a diagram illustrating an example of a base station (e.g., an eNB or a gNB) 602 that includes a distributed unit (DU) 604 and a radio unit (RU) 606 (which may or may not be co-located). The distributed unit 604 and the radio unit 606 exchange control plane information and user plane information via an LLS control/user (LLS-CUS) interface over a fronthaul link The LLS-CUS may include an LLS-C interface and an LLS-U interface that respectively provide a control plane (C-plane) and a user plane (U-plane). In some examples, a control plane refers to real-time control between a distributed unit and a radio unit. In some aspects, this may be in contrast with a management plane (M-Plane) that may provide non-real-time management operations. The distributed unit 604 and the radio unit 606 exchange management information via an LLS management (LLS-M) interface over the fronthaul link.

The base station 602 may include an RRC protocol layer 608 and a PDCP-C protocol layer 610 for control plane signaling as well as an SDAP protocol layer 612 and a PDCP-U protocol layer 614 for user plane signaling. In some examples, this functionality may be implemented in one or more control units (not shown in FIG. 6).

The distributed unit 604 includes an RLC protocol layer 616, a MAC protocol layer 618, and higher layer functionality of the physical layer (PHY-High 620). A CUS-plane protocol layer 622 communicates control plane information and user plane information via the LLS-CUS interface. An M-plane protocol layer 624 communicates management plane information via the LLS-M interface. In some implementations, the distributed unit 604 may correspond to any of the DUs shown in any of FIGS. 4, 5, and 22.

The radio unit 606 includes a CUS-plane protocol layer 626 that communicates control plane information and user plane information via the LLS-CUS interface as well as an M-plane protocol layer 628 that communicates management plane information via the LLS-M interface. The radio unit 606 also includes lower layer functionality of the physical layer (PHY-Low 630) and at least one RF chain 632 (e.g., each of which includes RF transmitter circuits and RF receiver circuits). In some implementations, the radio unit 606 may correspond to any of the RUs shown in any of FIGS. 4, 5, and 22.

In some examples, control plane messages sent between the distributed unit 604 and the radio unit 606 may be defined according to different section types. For example, section type-1 may be used for most of the downlink and uplink radio channels. Along with section type-1, other section extension commands (e.g., beyond those within the section header) may be used to communicate additional parameters specific to the section. For example, one or more of an extension type 4 (ExtType 4), an extension type 5 (ExtType 5), or an extension type 6 (ExtType 6) may be used in some scenarios. In some examples, any number of section extensions may be included within a data section. This dynamic approach may better accommodate future changes to the fronthaul specification in contrast with a scheme that involves redefining the section header or creating new section types to accommodate changes in the future.

As discussed above, a network may schedule resources for UL and/or DL communication between the network and the UE. For example, the network may schedule a time slot for a UE where the time slot includes a number of symbols (e.g., 14 symbols) and a number of resource elements (e.g., 12 REs). In some examples, a time slot may be subdivided into time slot sections, where different time slot sections may carry different types of information (e.g., PDSCH and DMRS). In some examples, these different types of information may be modulated using different modulation schemes. In an ORAN, scheduling information indicating this time slot scheduling may be sent from the network to the UE via the control plane between a distributed unit and a radio unit. For example, an extension type may be defined to carry information that specifies how resources are allocated in a time slot. In some examples, this information may indicate the time slot sections mentioned above.

For a time domain allocation, ORAN section type header fields such as a starting symbol identifier (startSymbolId), a symbol transition indicator (symInc), and the number of symbols (numSymbol) may be defined to indicate the allocated time domain resources in a time slot. For a frequency domain allocation, ORAN section type header fields such as the start of a PRB (startPrbc), the number of PRBs (numPrbc), and an RE mask (reMask) may be defined to indicate the allocated frequency domain resources in a time slot.

In some examples, an ORAN may support modulation compression to reduce the control plane overhead. In some aspects, modulation compression may involve representing constellation points as I and Q values that also overlap, such that different constellation sizes may be represented by a parameter (e.g., a word) with a single width. Here, the constellations may be shifted, whereby a twos-complement I and Q value may represent any given constellation point.

In some examples, an ORAN may define modulation compression parameter information elements (IEs), which may be associated with the extension types discussed above. For example, extension type 4 (ExtType 4) and extension type 5 (ExtType 5) may be used to communicate modulation compression parameters or modulation compression additional scaling parameters, respectively. An extension type 4 IE may include a constellation shift flag (csf) that indicates whether to shift a constellation. The extension type 4 IE may also include modulation compression scaler parameter values (modCompScaler) that specify the scale factor to apply to unshifted constellation points during decompression. An extension type 5 IE may include a csf, as well as one or more modulation compression power scale RE masks (mcScaleReMask) that define an RE mask to indicate the position of the REs that have the same scaling and modulation type within a PRB. The extension type 5 IE may also include scaling values for modulation compression (mcScaleOffset) that specify the scale factor to apply to unshifted constellation points during decompression.

When modulation compression is used, different symbols or REs that are modulated using different modulation schemes may be communicated in different time slot sections. For example, a first symbol that is modulated using 64 quadrature amplitude modulation (QAM) may be associated with a first time slot section (e.g., section 0), a second symbol that is modulated using QPSK may be associated with a second time slot section (e.g., section 1), and so on.

Also, different control plane messages may be used for discontinuous time domain allocations in a slot (irrespective of the compression technique used). For example, a first control plane message may be used to signal a first time domain allocation, a second control plane message may be used to signal a second time domain allocation that is not continuous with the first time domain allocation, and so on.

Figure 7:
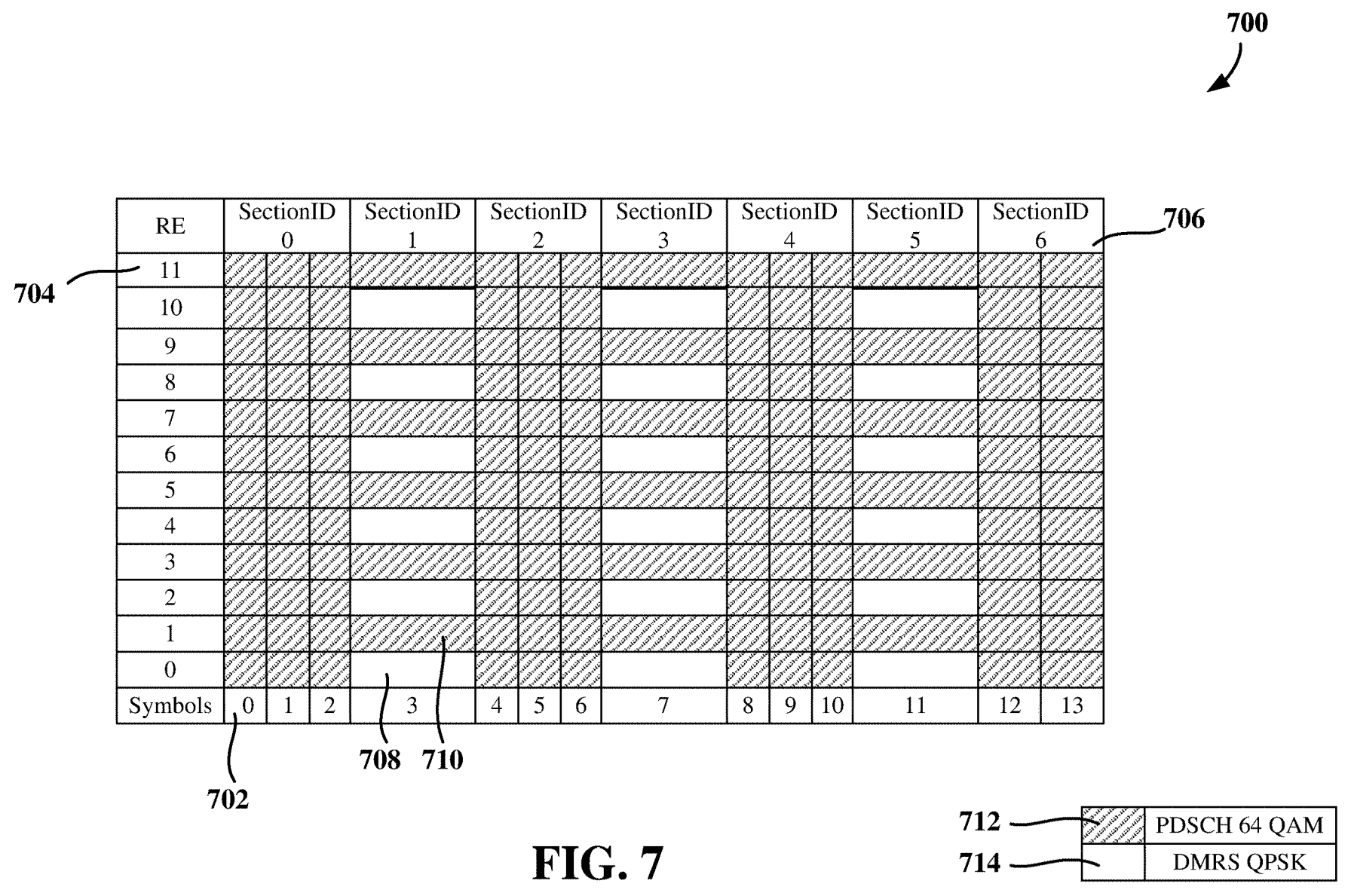

When modulation compression is used, the number of symbol sections may depend on the particular modulation schemes and the symbol allocations specified for different channels in given a PRB of a time slot allocated for a user. For example, FIG. 7 illustrates an example of a time slot 700 that includes 14 symbols (e.g., symbol 0 702) and 12 resource elements (e.g., RE 11 704). Here, the widths of the symbols (which would be of the same duration) have been modified for labeling purposes. In this example, a PDSCH 712 and a DMRS 714 are scheduled during the time slot 700 for an allocation of one PRB. An allocation with multiple PRBs is also possible.

In this example, the symbols are divided into different sections, each of which is assigned a section identifier (e.g., SectionID 6 706). Here, some of the sections (i.e., sections 0, 2, 4, and 6) apply the same modulation to all REs. As one non-limiting example, 64 QAM may be used for all REs allocated for PDSCH. Conversely, in other sections (i.e., sections 1, 3, and 5), different modulation schemes may be applied to different REs of a given symbol. As one non-limiting example, QPSK may be used for the REs (e.g., RE 0 708) of symbol 3 allocated for DMRS while 64 QAM may be used for the REs (e.g., RE 1 710) of symbol 3 allocated for PDSCH. Other types of modulation schemes and other types of information channels may be used in other examples.

For the allocation of PDSCH with DMRS symbols shown in FIG. 7, a distributed unit may generate a control plane message to indicate this allocation to a radio unit, using modulation compression to reduce the control plane overhead. For example, in an ORAN, information elements defined as Extension Type 4 (ExtType 4) IEs or Extension Type 5 (ExtType 5) IEs may be used to specify parameters for the modulation compression as discussed above.

FIG. 8 illustrates an example of a control plane (C-Plane) message 802 using ExtType 4 for the example of FIG. 7. The control plane message 802 includes 10 sections in this example The time slot sections that have mixed modulations (time slot sections 1, 3, and 5 in FIG. 7) require two rows (e.g., two control plane message sections) each in the control plane message 802 to specify the two types of modulations used for those time slot sections. In addition, a parameter symInc is used to indicate each transition to the next symbol. For example, the first row of the control plane message 802 includes a SectionID of 0 indicating that this row applies to section 0 of FIG. 7, a symInc value of 0 indicating no symbol transition, a number of symbols (numSymbols) parameter indicating that this section includes three symbols, an RE mask (reMask) [111111111111] indicating that the scaler value of this row applies to all of the REs in these three symbols, and a scaler value (e.g., a modulation compression scaler) indicating that 64 QAM (e.g., for PDSCH) is to be used for the indicated REs of these three symbols. As another example, the second row of the control plane message 802, includes a SectionID of 1 indicating that this row applies to section 1 of FIG. 7, a symInc value of 1 indicating a symbol transition, a number of symbols (numSymbols) parameter indicating that this section includes one symbol, an RE mask (reMask) [101010101010] indicating that the scaler value of this row applies to the even REs (e.g., RE 0, 2, 4, etc.) of this symbol, and a scaler value (e.g., a modulation compression scaler) indicating that QPSK (e.g., for DMRS) is to be used for the indicated REs of this symbol. As a further example, the third row of the control plane message 802, includes a SectionID of 1 indicating that this row applies to section 1 of FIG. 7, a symInc value of 0 indicating no symbol transition, a number of symbols (numSymbols) parameter indicating that this section includes one symbol, an RE mask (reMask) [010101010101] indicating that the scaler value of this row applies to the odd REs (e.g., RE 1, 3, 5, etc.) of this symbol, and a scaler value (e.g., a modulation compression scaler) indicating that 64 QAM (e.g., for PDSCH) is to be used for the indicated REs of this symbol. The other rows of the control plane message 802 may be deciphered in a similar manner.

The disclosure relates in some aspects to using a symbol mask to reduce the overhead of a control plane message. For example, by using a symbol mask, the number of sections in the control plane message 802 can be reduced. For example, the number of sections in the control plane message 802 may be reduced to three sections as shown in the control plane message 804 shown in FIG. 8. In addition, the control plane message 804 does not include symInc parameter or a numSymbols parameter. Consequently, in some examples, this reduction in the number of sections and the elimination of the symInc and numSymbols parameters may reduce overhead for a given UE by 144000 bytes per second in comparison with a conventional continuous allocation with symInc (e.g., the control plane message 802) or by 24000 bytes per second in comparison with a conventional discontinuous allocation with extType 6.

The first row of the control plane message 804 is associated with a first section (Section ID 0) and includes a first symbol mask with a value [11101110111011] indicating that symbols 0-2, 4-6, 8-9, 12, and 13 use the 64 QAM scaler (e.g., for PDSCH) indicated by a first scaler value in this row. In addition, a first RE mask (reMask) in this row has a value [111111111111] indicating that this 64 QAM scaler is to be applied to all REs of each symbol indicated by the first symbol mask.

The second row of the control plane message 804 is associated with a second section (Section ID 1) and includes a second symbol mask with a value [00010001000100] indicating that at least some of the REs of symbols 3, 7, and 11 use the QPSK scaler (e.g., for DMRS) indicated by a second scaler value in this row. In addition, a second RE mask (reMask) in this row has a value [101010101010] indicating that this QPSK scaler is to be applied only to the even REs (RE 0, 2, 4, etc.) of each symbol indicated by the second symbol mask.

The third row of the control plane message 804 is associated with the second section (Section ID 1) and includes a third symbol mask with a value [00010001000100] indicating that at least some of the REs of symbols 3, 7, and 11 use the 64 QAM scaler (e.g., for PDSCH) indicated by a third scaler value in this row. In addition, a third RE mask (reMask) in this row has a value [010101010101] indicating that this 64 QAM scaler is to be applied only to the odd REs (RE 1, 3, 5, etc.) of each symbol indicated by the third symbol mask.

Several additional examples of reducing the number of control plane messages and/or the number of rows (e.g., control plane message sections) of a control plane message follow. Other examples may be used in other scenarios.

Figure 9:
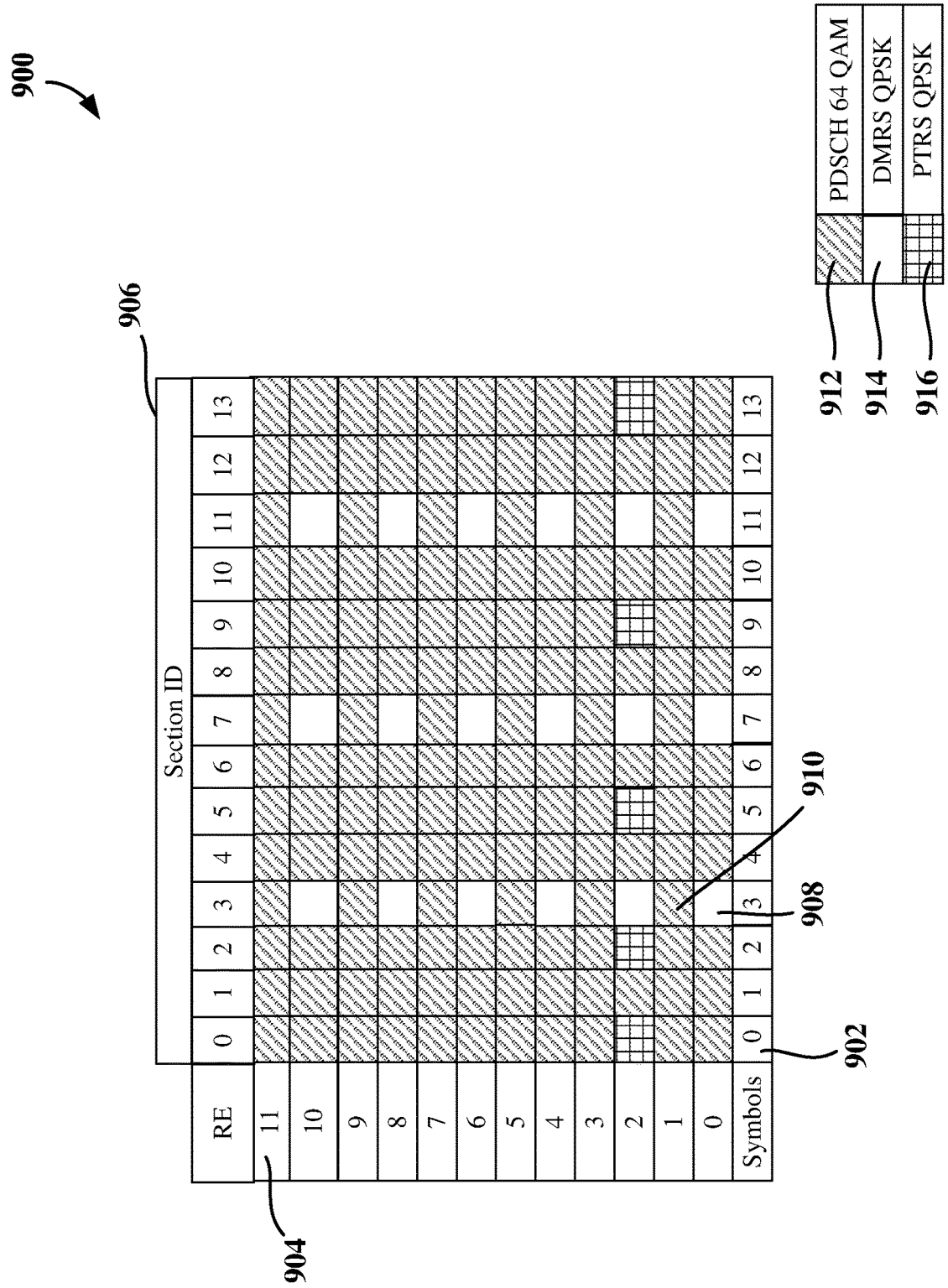
FIG. 9 is a diagram illustrating a second example of a time slot according to some aspects.

FIG. 9 illustrates an example of a time slot 900 that includes 14 symbols (e.g., symbol 0 902) and 12 resource elements (e.g., RE 11 904) for scheduling a PDSCH 912, a DMRS 914, and a phase tracking reference signal (PTRS) 916 during the time slot 900 for an allocation of one PRB. An allocation with multiple PRBs is also possible.

Similar to the example of FIG. 7, the symbols of the time slot 900 are divided into different sections, each of which is assigned a section identifier 906 (SectionIDs 0-13). The sections 1, 4, 6, 8, 10, and 12 apply the same modulation (e.g., 64 QAM for PDSCH) to all REs. The sections 0, 2, 3, 5, 7, 9, 11, and 13 apply different modulation schemes to different REs of a given symbol. In this example, QPSK is used for the REs (e.g., RE 0 908) of symbol 3 allocated for DMRS while 64 QAM is used for the REs (e.g., RE 1 910) of symbol 3 allocated for PDSCH. In addition, QPSK modulation is defined for PTRS in RE2 of symbols 0, 2, 5, 9, and 13. Other types of modulation schemes and other types of information channels may be used in other examples.

FIG. 10 illustrates an example of a control plane message 1002 using ExtType 4 for the example of FIG. 9. The control plane message 1002 includes 22 sections in this example The sections that have mixed modulations (sections 0, 2, 3, 5, 7, 9, 11, and 13) require two rows (e.g., control plane message sections) each in the control plane message 1002. The first row of the control plane message 1002, includes a SectionID of 0 indicating that this row applies to section 0 of FIG. 9, a symInc value of 0 indicating no symbol transition, a number of symbols (numSymbols) parameter indicating that this section includes one symbol, and an RE mask (reMask) [110111111111] indicating that the scaler value of this row applies to all of the REs of this symbol except for RE 2, where the scaler value (e.g., a modulation compression scaler) indicates that 64 QAM (e.g., for PDSCH) is to be used for the indicated REs of this symbol. The second row of the control plane message 1002 includes a SectionID of 0 indicating that this row applies to section 0 of FIG. 9, a symInc value of 0 indicating no symbol transition, a number of symbols (numSymbols) parameter indicating that this section includes one symbol, and an RE mask (reMask) [001000000000] indicating that the scaler value of this row applies to RE2 of this symbol, where the scaler value (e.g., a modulation compression scaler) indicates that QPSK (e.g., for PTRS) is to be used for the indicated RE of this symbol. The third row of the control plane message 1002 includes a SectionID of 1 indicating that this row applies to section 1 of FIG. 9, a symInc value of 1 indicating a symbol transition, a number of symbols (numSymbols) parameter indicating that this section includes one symbol, and an RE mask (reMask) [111111111111] indicating that the scaler value of this row applies to all of the REs of this symbol, where the scaler value (e.g., a modulation compression scaler) indicates that 64 QAM (e.g., for PDSCH) is to be used for the indicated REs of this symbol. The other rows of the control plane message 1002 may be deciphered in a similar manner.

By using a symbol mask as discussed herein, the number of sections in the control plane message 1002 can be reduced (e.g., to five sections as shown in the control plane message 1004 shown in FIG. 10). In some examples, this reduction in the number of sections may reduce overhead for a given UE by 368000 bytes per second in comparison with a conventional continuous allocation with symInc (e.g., the control plane message 1002) or by 40000 bytes per second in comparison with a conventional discontinuous allocation with extType 6.

In the first row of the control plane message 1004, a first symbol mask with a value [01001010101010] indicates that symbols 1, 4, 6, 8, 10, and 12 (associated with SectionID 0) use a 64 QAM scaler (e.g., for PDSCH). In addition, an RE mask (reMask) with a value [111111111111] indicates that this 64 QAM scaler is to be applied to all REs of the indicated symbols.

In the second row of the control plane message 1004, a second symbol mask with a value [00010001000100] indicates that at least some of the REs of symbols 3, 7, and 11 (associated with SectionID 1) use a 64 QAM scaler (e.g., for PDSCH). In addition, an RE mask (reMask) with a value [010101010101] indicates that this 64 QAM scaler is to be applied to all odd REs of the indicated symbols.

In the third row of the control plane message 1004, a third symbol mask with a value [00010001000100] indicates that at least some of the REs of symbols 3, 7, and 11 (associated with SectionID 1) use a QPSK scaler (e.g., for DMRS). In addition, an RE mask (reMask) with a value [101010101010] indicates that this QPSK scaler is to be applied to all even REs of the indicated symbols.

In the fourth row of the control plane message 1004, a fourth symbol mask with a value [10100100010001] indicates that at least some of the REs of symbols 0, 2, 5, 9, and 13 (associated with SectionID 2) use a 64 QAM scaler (e.g., for PDSCH). In addition, an RE mask (reMask) with a value [110111111111] indicates that this 64 QAM scaler is to be applied to all of the REs of the indicated symbols except for RE2.

In the fifth row of the control plane message 1004, a fifth symbol mask with a value [10100100010001] indicates that at least some of the REs of symbols 0, 2, 5, 9, and 13 (associated with SectionID 2) use a QPSK scaler (e.g., for PTRS). In addition, an RE mask (reMask) with a value [001000000000] indicates that this QPSK scaler is to be applied only to RE 2 of the indicated symbols.

Figure 11:
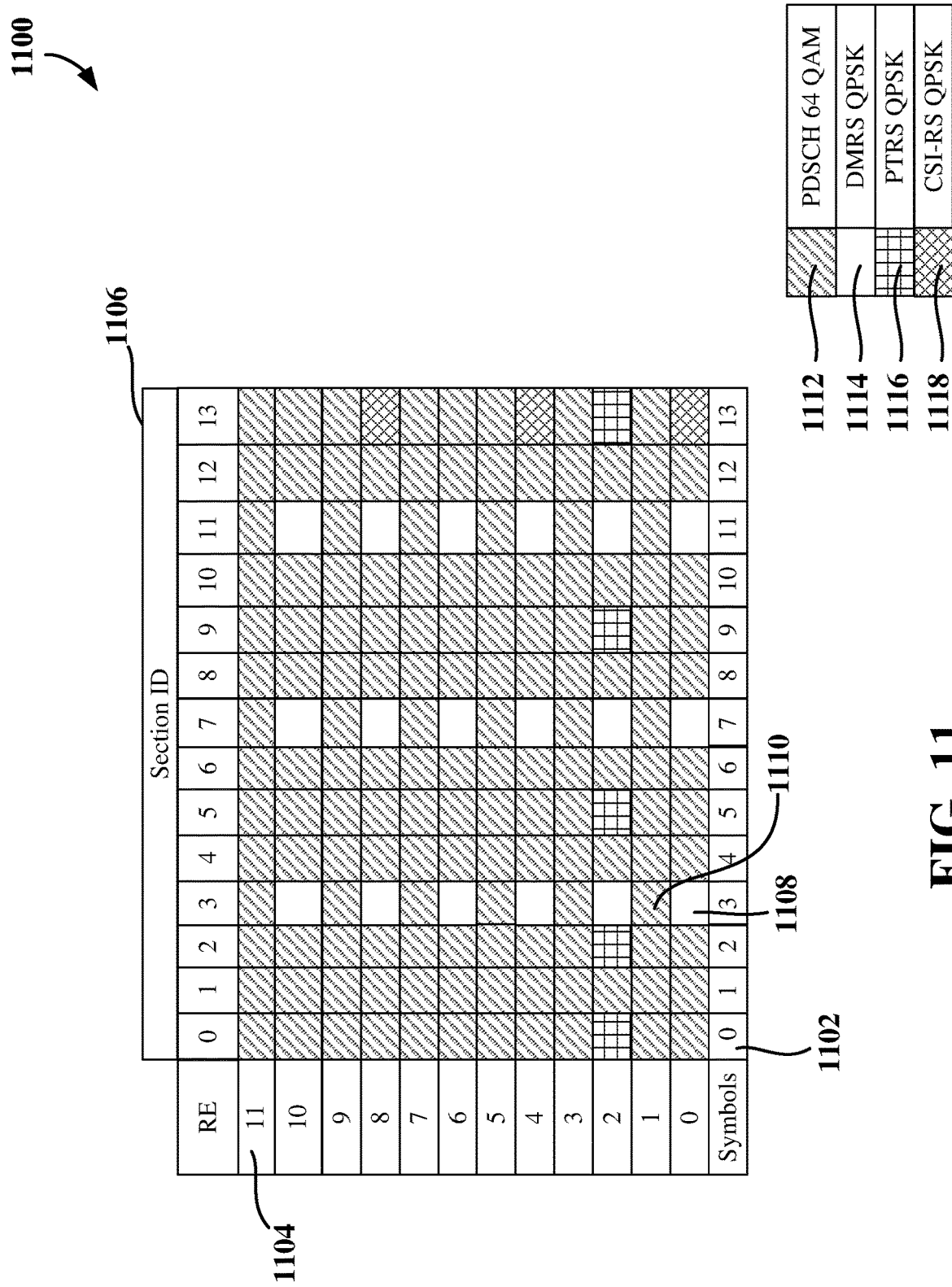
FIG. 11 is a diagram illustrating a third example of a time slot according to some aspects.

FIG. 11 illustrates an example of a time slot 1100 that includes 14 symbols (e.g., symbol 0 102) and 12 resource elements (e.g., RE 11 1104) for scheduling a PDSCH 1112, a DMRS 1114, a PTRS 1116, and a CSI-RS 1118 during the time slot 1100 for an allocation of one PRB. An allocation with multiple PRBs is also possible.

The symbols are divided into different sections, each of which is assigned a section identifier 1106 (SectionIDs 0-13). The sections 1, 4, 6, 8, 10, and 12 apply the same modulation (64 QAM for PDSCH) to all REs. In contrast, sections 0, 2, 3, 5, 7, 9, 11, and 13 apply different modulation schemes to different REs of a given symbol. As one non-limiting example, QPSK may be used for the REs (e.g., RE 0 1108) of symbol 3 allocated for DMRS while 64 QAM may be used for the REs (e.g., RE 1 1110) of symbol 3 allocated for PDSCH. In addition, QPSK modulation is defined for PTRS in RE2 of symbols 0, 2, 5, 9, and 13. Also, QPSK modulation is defined for CSI-RS in REs 0, 4, and 8 of symbol 13. Other types of modulation schemes and other types of information channels may be used in other examples.

FIG. 12 illustrates an example of a control plane message 1202 using ExtType 4 for the example of FIG. 11. The control plane message 1202 includes 23 sections in this example Similar to FIG. 10, the first row of the control plane message 1202 includes a SectionID of 0 indicating that this row applies to section 0 of FIG. 11, a symInc value of 0 indicating no symbol transition, a number of symbols (numSymbols) parameter indicating that this section includes one symbol, and an RE mask (reMask) [110111111111] indicating that the scaler value of this row applies to all of the REs of this symbol except for RE 2, where the scaler value (e.g., a modulation compression scaler) indicates that 64 QAM (e.g., for PDSCH) is to be used for the indicated REs of this symbol. Similar to FIG. 10, the second row of the control plane message 1202 includes a SectionID of 0 indicating that this row applies to section 0 of FIG. 11, a symInc value of 0 indicating no symbol transition, a number of symbols (numSymbols) parameter indicating that this section includes one symbol, and an RE mask (reMask) [001000000000] indicating that the scaler value of this row applies to RE2 of this symbol, where the scaler value (e.g., a modulation compression scaler) indicates that QPSK (e.g., for PTRS) is to be used for the indicated RE of this symbol. Similar to FIG. 10, the third row of the control plane message 1202 includes a SectionID of 1 indicating that this row applies to section 1 of FIG. 11, a symInc value of 1 indicating a symbol transition, a number of symbols (numSymbols) parameter indicating that this section includes one symbol, and an RE mask (reMask) [111111111111] indicating that the scaler value of this row applies to all of the REs of this symbol, where the scaler value (e.g., a modulation compression scaler) indicates that 64 QAM (e.g., for PDSCH) is to be used for the indicated REs of this symbol. In the example of FIG. 12, the last row of the control plane message 1202 includes a SectionID of 13 indicating that this row applies to section 13 of FIG. 11, a symInc value of 0 indicating no symbol transition, a number of symbols (num-Symbols) parameter indicating that this section includes one symbol, and an RE mask (reMask) [100010001000] indicating that the scaler value of this row applies to REs 0, 4, and 8 of this symbol, where the scaler value (e.g., a modulation compression scaler) indicates that QPSK (e.g., for CSI-RS) is to be used for the indicated REs of this symbol. The other rows of the control plane message 1202 may be deciphered in a similar manner By using a symbol mask as discussed herein, the number of sections in the control plane message 1202 can be reduced (e.g., to seven sections as shown in the control plane message 1204 shown in FIG. 12). In some examples, this reduction in the number of sections may reduce overhead for a given UE by 328000 bytes per second in comparison with a conventional continuous allocation with symInc (e.g., the control plane message 1202) or by 56000 bytes per second in comparison with a conventional discontinuous allocation with extType 6 (e.g., the control plane message 1202).

In the first row of the control plane message 1204, a first symbol mask with a value [01001010101010] indicates that symbols 1, 4, 6, 8, 10, and 12 (associated with SectionID 0) use a 64 QAM scaler (e.g., for PDSCH). In addition, an RE mask (reMask) with a value [111111111111] indicates that this 64 QAM scaler is to be applied to all REs of the indicated symbols.

In the second row of the control plane message 1204, a second symbol mask with a value [00010001000100] indicates that at least some of the REs of symbols 3, 7, and 11 (associated with SectionID 1) use a 64 QAM scaler (e.g., for PDSCH). In addition, an RE mask (reMask) with a value [010101010101] indicates that this 64 QAM scaler is to be applied to all odd REs of the indicated symbols.

In the third row of the control plane message 1204, a third symbol mask with a value [00010001000100] indicates that at least some of the REs of symbols 3, 7, and 11 (associated with SectionID 1) use a QPSK scaler (e.g., for DMRS). In addition, an RE mask (reMask) with a value [101010101010] indicates that this QPSK scaler is to be applied to all even REs of the indicated symbols.

In the fourth row of the control plane message 1204, a fourth symbol mask with a value [10100100010000] indicates that at least some of the REs of symbols 0, 2, 5, and 9 (associated with SectionID 2) use a 64 QAM scaler (e.g., for PDSCH). In addition, an RE mask (reMask) with a value [110111111111] indicates that this 64 QAM scaler is to be applied to all of the REs of the indicated symbols except for RE2.

In the fifth row of the control plane message 1204, a fifth symbol mask with a value [10100100010001] indicates that at least some of the REs of symbols 0, 2, 5, 9, and 13 (associated with SectionID 2) use a QPSK scaler (e.g., for PTRS). In addition, an RE mask (reMask) with a value [001000000000] indicates that this QPSK scaler is to be applied only to RE 2 of the indicated symbols.

In the sixth row of the control plane message 1204, a sixth symbol mask with a value [00000000000001] indicates that at least some of the REs of symbol 13 (associated with SectionID 3) use a 64 QAM scaler (e.g., for PDSCH). In addition, an RE mask (reMask) with a value [010101110111] indicates that this 64 QAM scaler is to be applied to REs 1, 3, 5-7, and 9-11 of the indicated symbol.

In the seventh row of the control plane message 1204, a seventh symbol mask with a value [00000000000001] indicates that at least some of the REs of symbol 13 (associated with SectionID 3) use a QPSK scaler (e.g., for CSI-RS). In addition, an RE mask (reMask) with a value [100010001000] indicates that this QPSK scaler is to be applied to REs 0, 4, and 8 of the indicated symbol.

A symbol mask also may be used to reduce the number of C-plane messages and/or C-plane message sections in scenarios where modulation compression is not used. Several examples follow.

Figure 13:
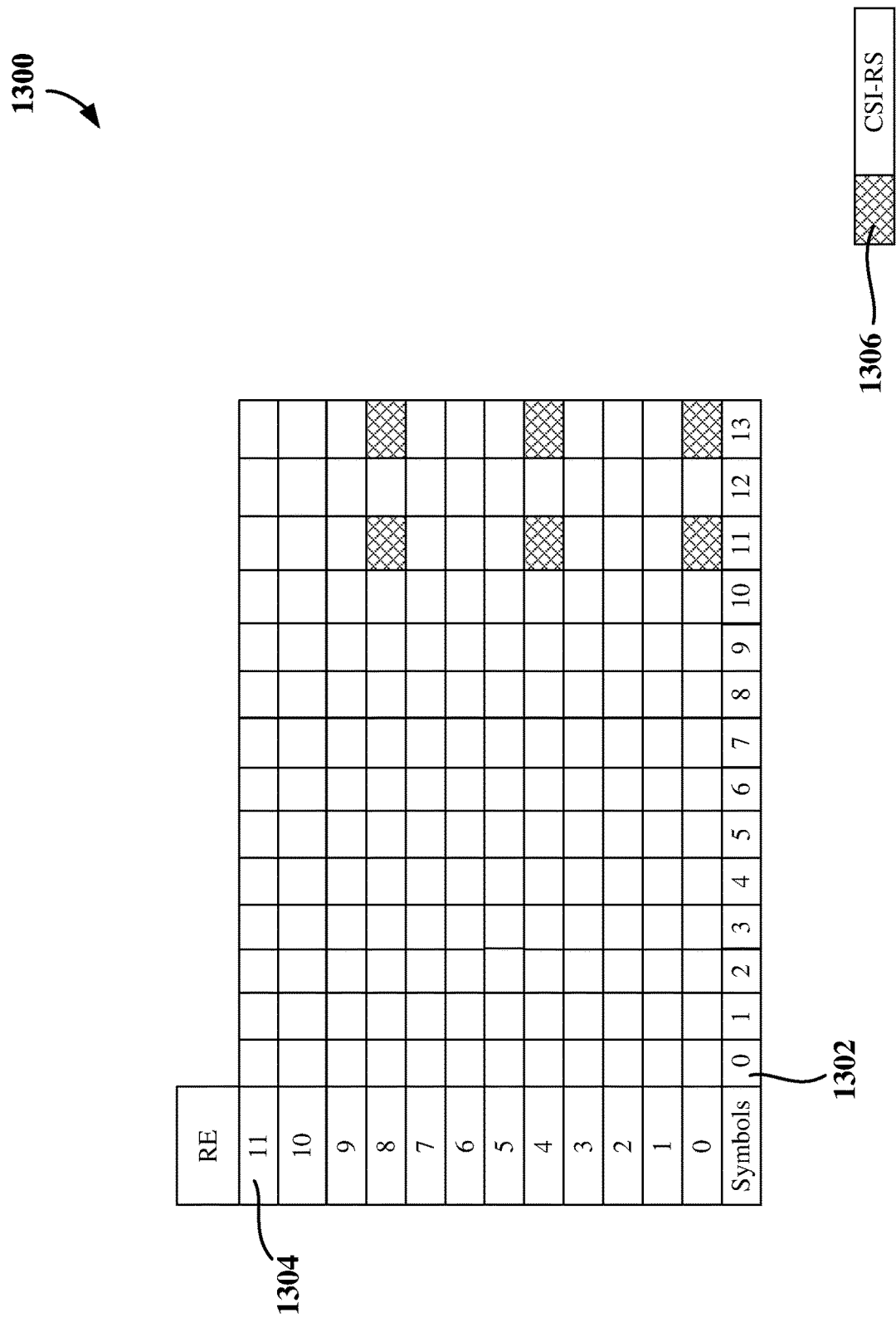
FIG. 13 is a diagram illustrating a fourth example of a time slot according to some aspects.

FIG. 13 illustrates an example of a time slot 1300 that includes 14 symbols (e.g., symbol 0 1302) and 12 resource elements (e.g., RE 11 1304) for scheduling CSI-RS during the time slot 1300 for an allocation of one PRB. An allocation with multiple PRBs is also possible. In this example, a CSI-RS 1306 is allocated in REs 0, 4, and 8 of symbols 11 and 13. This CSI-RS allocation may be associated with a particular type of modulation in some examples. Other types of information channels may be used in other examples.

Figure 14:
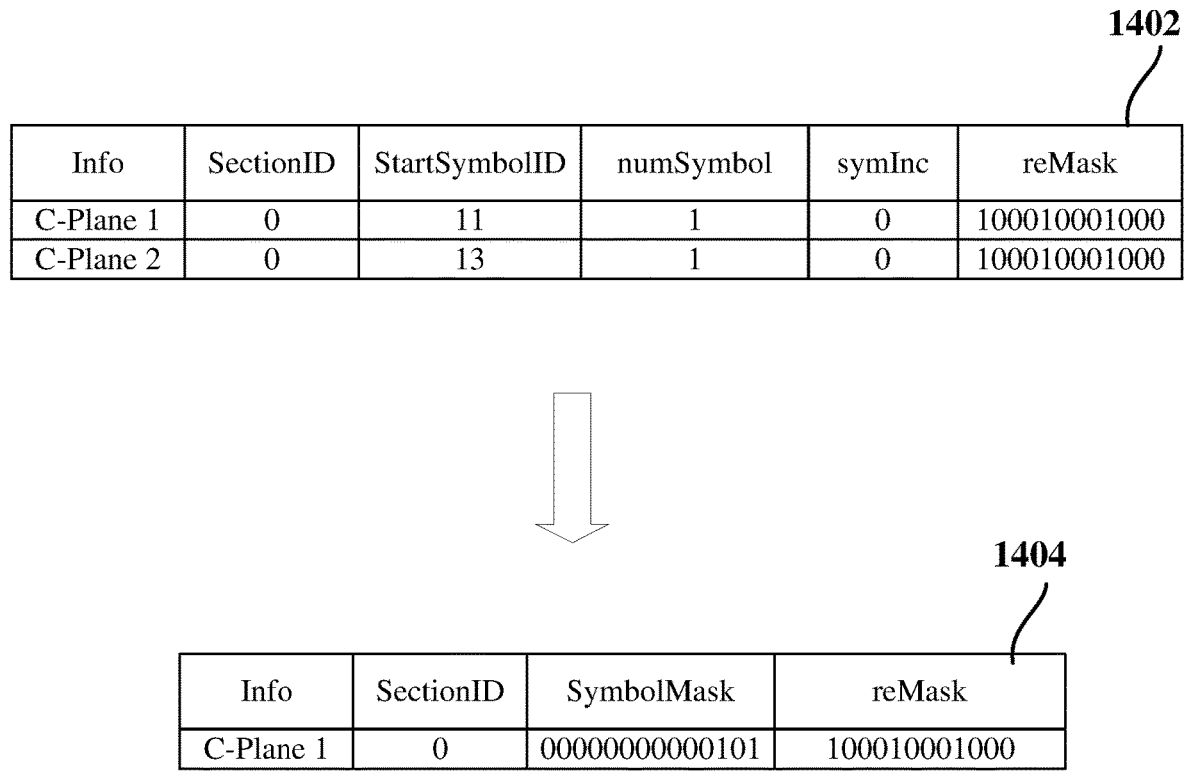
FIG. 14 is a diagram illustrating a fourth example of a control plane message that includes a symbol mask according to some aspects.

FIG. 14 illustrates an example of control plane messages 1402 for the example of FIG. 13. Multiple control plane messages may be used in this case since the symbol allocations of FIG. 13 are discontinuous. A first control plane message (C-Plane 1) includes a SectionID of 0 indicating that this message applies to section 0 of FIG. 13 (e.g., only a single section is defined in FIG. 13), a starting symbol identifier (StartSymbolID) indicating that the allocation for this message starts at symbol 11, a number of symbols (numSymbols) parameter indicating that this allocation is for one symbol, a symInc value of 0 indicating no symbol transition, and an RE mask (reMask) [100010001000] indicating that CSI-RS is allocated in REs 0, 4, and 8 of this symbol. A second control plane message (C-Plane 2) includes a SectionID of 0 indicating that this message applies to section 0 of FIG. 13, a starting symbol identifier (StartSymbolID) indicating that the allocation for this message starts at symbol 13, a number of symbols (numSymbols) parameter indicating that this allocation is for one symbol, a symInc value of 0 indicating no symbol transition, and an RE mask (reMask) [100010001000] indicating that CSI-RS is allocated in REs 0, 4, and 8 of this symbol.

By using a symbol mask as discussed herein, the number of control plane messages 1402 can be reduced (e.g., to one message as shown in the control plane message 1404 shown in FIG. 14). In some examples, this reduction in the number of control plane messages may reduce overhead for a given UE by 112000 bytes per second in comparison with a conventional continuous allocation with symInc (e.g., the control plane messages 1402) or by 8000 bytes per second in comparison with a conventional discontinuous allocation with extType 6.

The control plane message 1404 includes a first symbol mask with a value [00000000000101] indicating that the CSI-RS allocation applies to symbols 11 and 13 (associated with SectionID 0). In addition, an RE mask (reMask) with a value [1000100001000] indicates that CSI-RS is allocated in REs 0, 4, and 8 of these symbols.

FIG. 15 illustrates an example of a time slot 1500 that includes 14 symbols (e.g., symbol 0 1502) and 12 resource elements (e.g., RE 11 1504) for discontinuous scheduling of a PDSCH 1506, a DMRS 1508, and a PDCCH 1510 during the time slot 1500 for an allocation of one PRB. An allocation with multiple PRBs is also possible. In this example, PDCCH is allocated in all REs of symbols 0 and 1. In addition, PDSCH is allocated in all REs of symbols 3-5.

Each of these allocations may be associated with a particular type of modulation in some examples (e.g., 64 QAM is used for PDSCH and QPSK is used for DMRS). Other types of information channels may be used in other examples.

Figure 16:
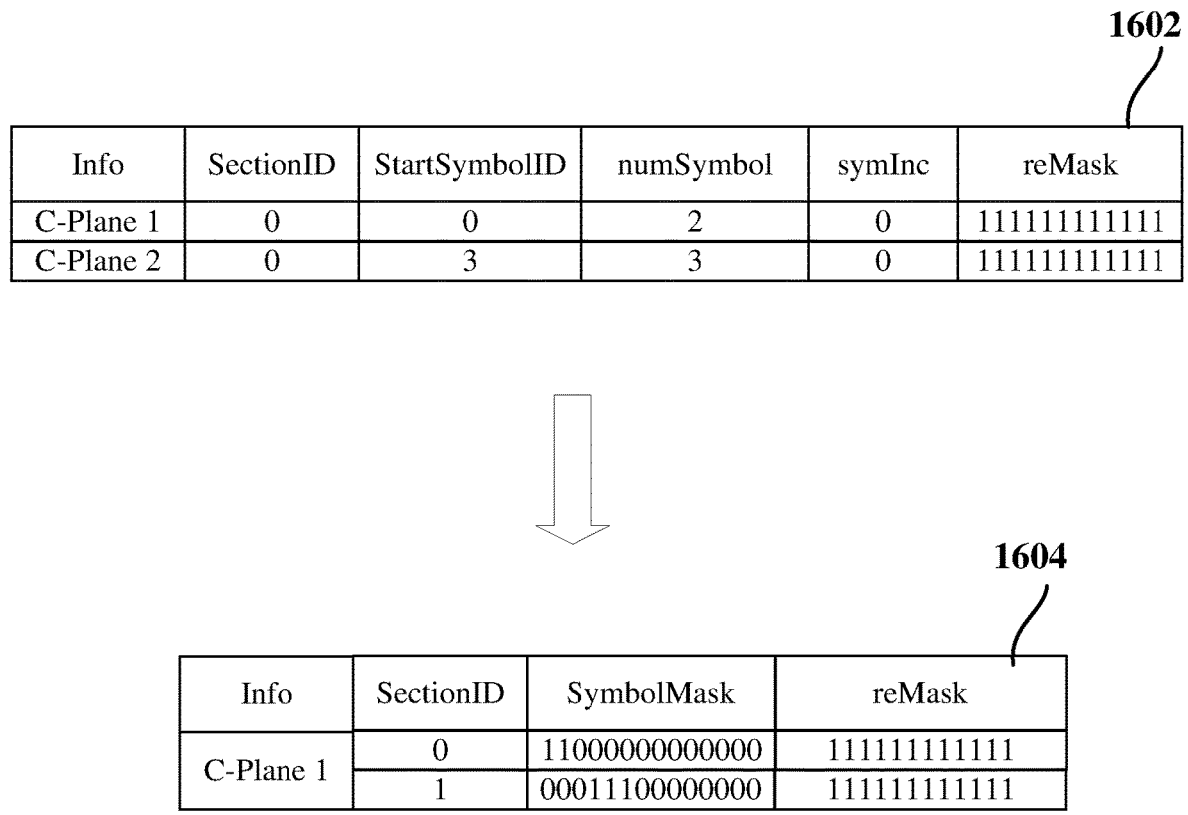
FIG. 16 is a diagram illustrating a fifth example of a control plane message that includes a symbol mask according to some aspects.

FIG. 16 illustrates an example of control plane messages 1602 for the example of FIG. 15. Multiple control plane messages may be used in this case since the symbol allocations of FIG. 15 are not continuous. A first control plane message (C-Plane 1) includes a SectionID of 0 indicating that this message applies to section 0 of FIG. 15 (e.g., only a single section is defined in FIG. 15), a starting symbol identifier (StartSymbolID) indicating that the allocation for this message starts at symbol 0, a number of symbols (numSymbols) parameter indicating that this allocation is for two symbols, a symInc value of 0 indicating no symbol transition, and an RE mask (reMask) [111111111111] indicating that PDCCH is allocated in all REs of the indicated symbols (i.e., symbols 0 and 1). A second control plane message (C-Plane 2) includes a SectionID of 0 indicating that this message applies to section 0 of FIG. 15, a starting symbol identifier (StartSymbolID) indicating that the allocation for this message starts at symbol 3, a number of symbols (numSymbols) parameter indicating that this allocation is for three symbols, a symInc value of 0 indicating no symbol transition, and an RE mask (reMask) [111111111111] indicating that PDSCH is allocated in all REs of the indicated symbols (i.e., symbols 3-5). Since modulation compression is not used in this example, DMRS and PDSCH REs will not be distinguished by different scaler values. Hence a single RE mask can be used to denote both channels.

By using a symbol mask as discussed herein, the number of control plane messages 1602 can be reduced (e.g., to one message as shown in the control plane message 1604 shown in FIG. 16). In some examples, this reduction in the number of control plane messages may reduce overhead for a given UE by 88000 bytes per second in comparison with a conventional continuous allocation with symInc (e.g., the control plane messages 1602) or by 16000 bytes per second in comparison with a conventional discontinuous allocation with extType 6.

A first row of the control plane message 1604 includes a first symbol mask with a value [11000000000000] indicating that the PDCCH allocation applies to symbols 0 and 1 (associated with SectionID 0). In addition, an RE mask (reMask) with a value [111111111111] indicates that the PDCCH is allocated in all REs of these symbols.

A second row of the control plane message 1604 includes a second symbol mask with a value [00011100000000] indicating that the PDSCH allocation applies to symbols 3-5 (associated with SectionID 1). In addition, an RE mask (reMask) with a value [111111111111] indicates that the PDSCH is allocated in all REs of these symbols.

Figure 17:
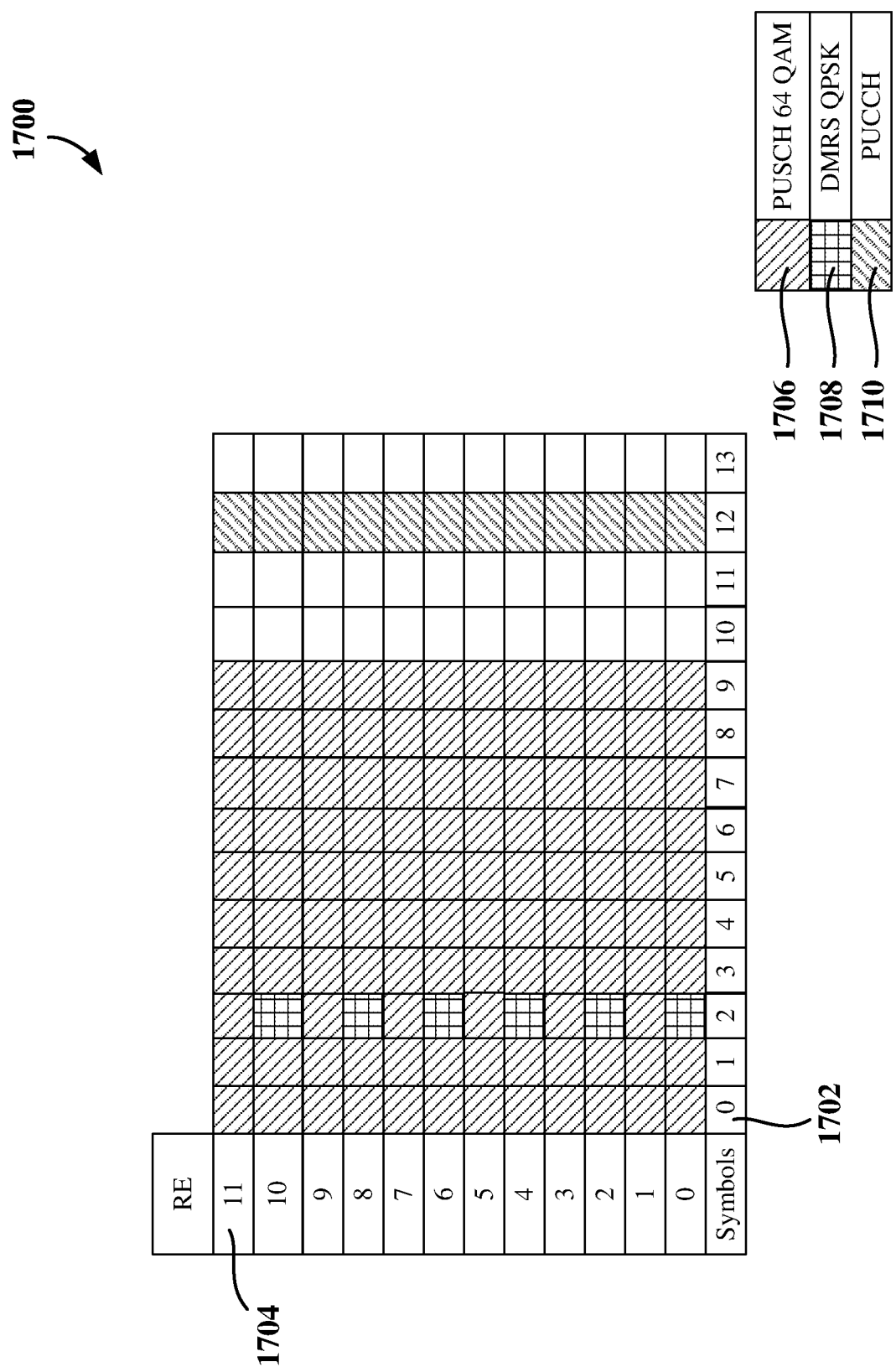
FIG. 17 is a diagram illustrating a sixth example of a time slot according to some aspects.

FIG. 17 illustrates an example of a time slot 1700 that includes 14 symbols (e.g., symbol 0 1702) and 12 resource elements (e.g., RE 11 1704) for uplink scheduling of a PUSCH 1706, a DMRS 1708, and a PUCCH 1710 during the time slot 1700 for an allocation of one PRB. An allocation with multiple PRBs is also possible. In this example, PUSCH is allocated in all REs of symbols 0-9. In addition, PUCCH is allocated in all REs of symbol 12. Each of these allocations may be associated with a particular type of modulation in some examples (e.g., 64 QAM is used for PUSCH). Other types of information channels may be used in other examples.

Figure 18:
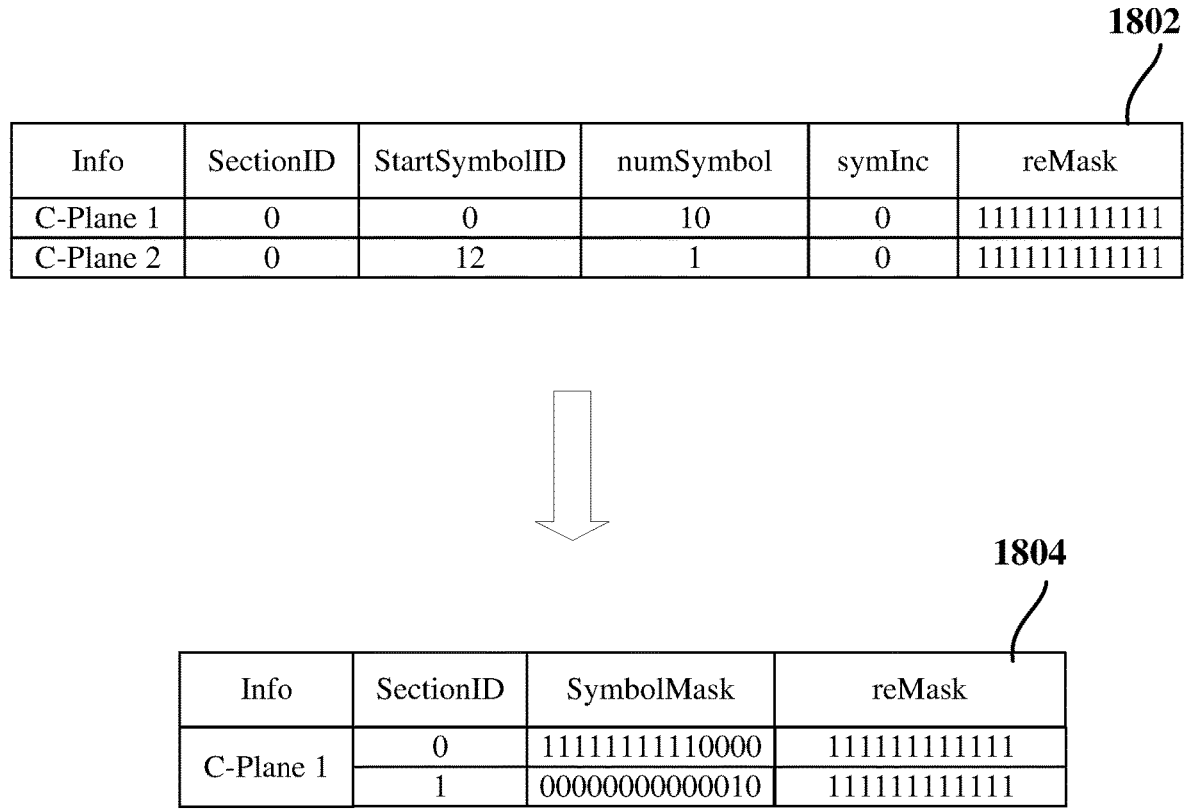
FIG. 18 is a diagram illustrating a sixth example of a control plane message that includes a symbol mask according to some aspects.

FIG. 18 illustrates an example of control plane messages 1802 for the example of FIG. 17. Multiple control plane messages may be used in this case since the symbol allocations of FIG. 17 are not continuous. A first control plane message (C-Plane 1) includes a SectionID of 0 indicating that this message applies to section 0 of FIG. 17 (e.g., only a single section is defined in FIG. 17), a starting symbol identifier (StartSymbolID) indicating that the allocation for this message starts at symbol 0, a number of symbols (numSymbols) parameter indicating that this allocation is for ten symbols, a symInc value of 0 indicating no symbol transition, and an RE mask (reMask) [111111111111] indicating that PUSCH is allocated in all REs of the indicated symbols (i.e., symbols 0-9). Since modulation compression is not used in this example, DMRS and PUSCH REs will not be distinguished by different scaler values. Hence a single RE mask can be used to denote both channels. A second control plane message (C-Plane 2) includes a SectionID of 0 indicating that this message applies to section 0 of FIG. 17, a starting symbol identifier (StartSymbolID) indicating that the allocation for this message starts at symbol 12, a number of symbols (numSymbols) parameter indicating that this allocation is for one symbol, a symInc value of 0 indicating no symbol transition, and an RE mask (reMask) [111111111111] indicating that PUCCH is allocated in all REs of the indicated symbol (i.e., symbol 12).

By using a symbol mask as discussed herein, the number of control plane messages 1802 can be reduced (e.g., to one message as shown in the control plane message 1804 shown in FIG. 18). In some examples, this reduction in the number of control plane messages may reduce overhead for a given UE by 88000 bytes per second in comparison with a conventional continuous allocation with symInc (e.g., the control plane messages 1802) or by 16000 bytes per second in comparison with a conventional discontinuous allocation with extType 6.

A first row of the control plane message 1804 includes a first symbol mask with a value [11111111110000] indicating that the PUSCH allocation applies to symbols 0-9 (associated with SectionID 0). In addition, an RE mask (reMask) with a value [111111111111] indicates that the PUSCH is allocated in all REs of these symbols.

A second row of the control plane message 1804 includes a second symbol mask with a value [00000000000010] indicating that the PUCCH allocation applies to symbol 12 (associated with SectionID 1). In addition, an RE mask (reMask) with a value [111111111111] indicates that the PUCCH is allocated in all REs of this symbol.

As mentioned above, an ORAN may support continuous (e.g., contiguous) allocations and noncontinuous (e.g., non-contiguous) allocations.

In some ORAN implementations, the Resource Allocation Type 0 (e.g., RAT-0) for a noncontinuous allocation is supported through Extension Type 6 (ExtType 6). RAT-0 is resource block group (RBG) based allocation where multiple RBs are grouped into a RBG and the distributed unit signals to the radio unit whether that RBG is used for data allocation or not (by enabling or disabling the appropriate bits).

The parameters RBG size (rbgSize) and RBG mask (rbgMask) may be used for representing the RAT-0 allocation in Extension Type 6. In this case, parameters such as a starting symbol identifier (startSymbolId), symInc, and the number of symbols (numSymbol) might not be used for the identification of symbols in a time slot. Instead, a 14 bit field symbol mask (symbolMask) may be used where each bit of the symbol mask represents whether the corresponding symbol is enabled or not.

In some ORAN implementations, the Resource Allocation Type 1 (e.g., RAT-1) may be used for a continuous allocation. However, this RAT-1 allocation does not use Extension Type 6.

The disclosure relates in some aspects to using a new extension type to communicate a symbol mask for a PRB (e.g., a RAT-1 continuous allocation). Such an extension type may be used along with any other applicable extension types (e.g., extType 4 or extType 5 when modulation compression is used). In some examples, when this new extension type is used, a radio unit may ignore the startSymbolId, symInc, and numSymbol from the section header and instead use the symbol mask to identify time domain allocation.

Figure 19:
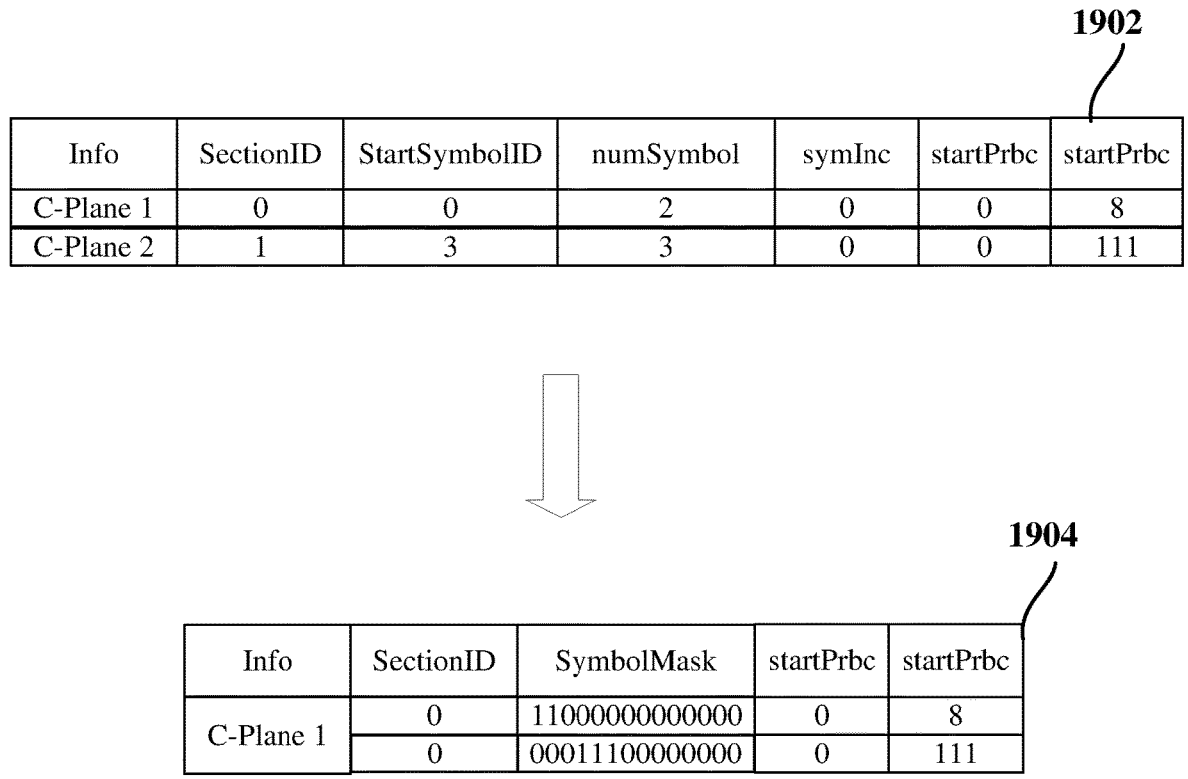
FIG. 19 is a diagram illustrating a seventh example of a control plane message that includes a symbol mask according to some aspects.

FIG. 19 illustrates two control plane messages (C-Plane 1 and C-Plane 2) 1902 for a PDCCH allocation in symbols 0 and 1 and a PDSCH allocation in symbols 3, 4, and 5. Here, using conventional techniques based on startSymbolId, symInc, and numSymbol as shown in FIG. 19, two C-Plane messages are needed since symInc cannot be used here (to combine the C-Plane messages) given that there is a 1 symbol gap between the allocations.

By using a symbol mask, however, the above control plane messages can be combined into one message as shown in the control plane message 1904 of FIG. 19. In a first row of the control plane message 1904, a first symbol mask with a value [11000000000000] specifies that symbols 0 and 1 are allocated. In a second row of the control plane message 1904, a second symbol mask with a value [00011100000000] specifies that symbols 3, 4, and 5 are allocated.

Different extension types may be used in different examples to convey the symbol allocation for a continuous allocation.

Figure 20:
FIG. 20 is a diagram illustrating a first example of a section extension type for a discontinuous frequency domain allocation according to some aspects.

In some examples, an Extension Type 6 information element 2000 may be used to convey the symbol allocation for a continuous allocation as shown in FIG. 20. Here, the symbol mask 2002 and the symbol mask 2004 may convey the symbol mask information (e.g., of the control plane message 1904 of FIG. 19).

Figure 21:
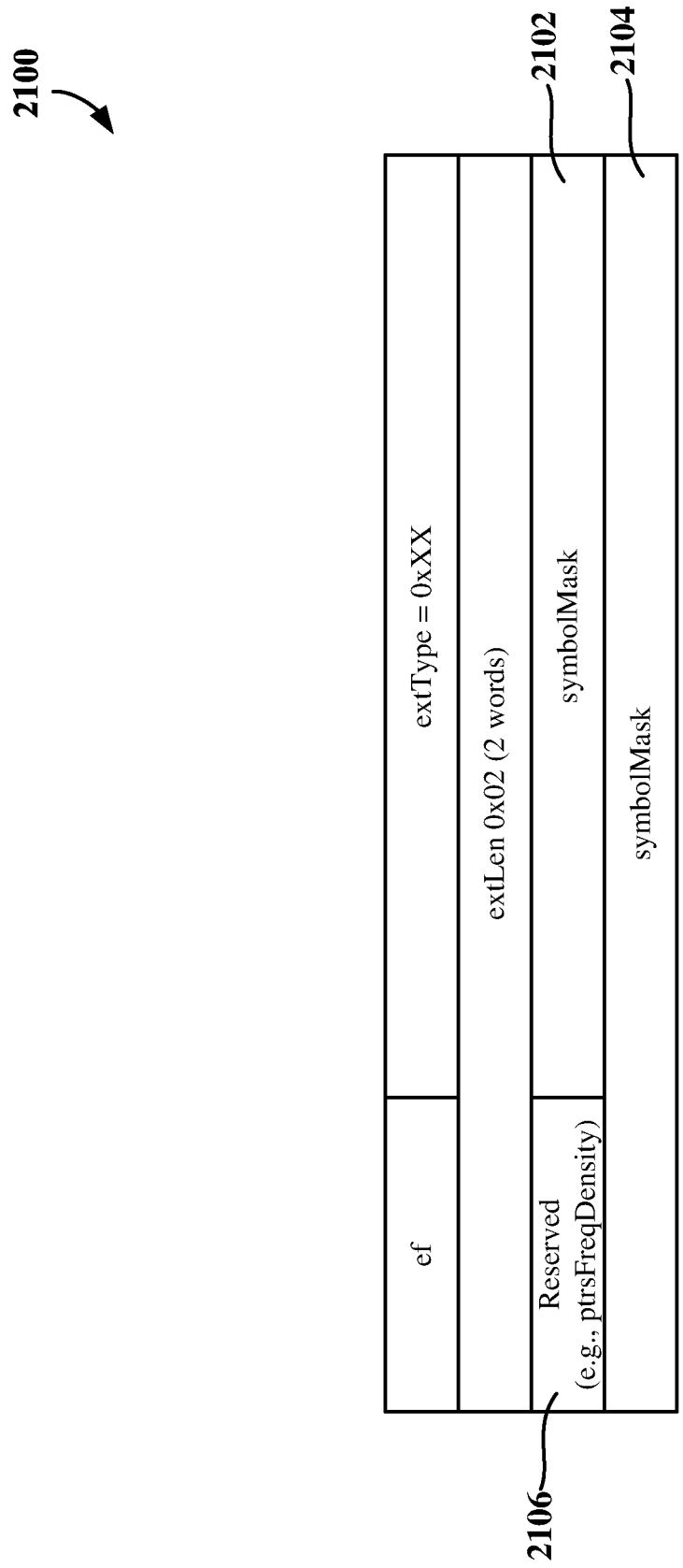
FIG. 21 is a diagram illustrating a second example of a section extension type for a discontinuous frequency domain allocation according to some aspects.

In some examples, a new extension type (e.g., Extension Type XX, where XX may be any suitable number) information element 2100 may be used to convey the symbol allocation for a continuous allocation as shown in FIG. 21. Here, the symbol mask 2102 and the symbol mask 2104 may convey the symbols mask information (e.g., of the control plane message 1904 of FIG. 19). In this case, since the rbgSize and rbgMask parameters may be redundant for continuous PRB allocations, a new section type that does not incorporate these redundant fields may be used to reduce the fronthaul bandwidth overhead.

In some examples, the reserved parameter 2106 of FIG. 21 may be a phase tracking reference signal frequency density (ptrsFreqDensity) parameter. In some examples, the ptrsFreqDensity parameter may be used when PTRSs with different frequency densities are allocated. Conventionally, extType-6 also does not cover this scenario. In some examples, the following values may be defined for a two-bit ptrsFreqDensity parameter: ptrsFreqDensity=00 (PTRS not used), ptrsFreqDensity=01 (frequency density=2 PRBs, e.g., PTRS occurs once every two PRBs), ptrsFreqDensity=10 (frequency density=4 PRBs, e.g., PTRS occurs once every four PRBs), and ptrsFreqDensity=11 (reserved).

The information element 2100 may be used in some examples to support different PTRS frequency densities in a single section which is not supported by extType-6 and a resource block indicator. In extType-6, there are only 28 bits. Thus, even if 1 bit is mapped to a 4 RBs, extType 6 will only handle a limited number of RBs (e.g., up to 112 RBs, or up to 273 RBs in 5G). In addition, the resource block indicator only supports an alternate RB allocation scenario of a single PTRS density (e.g., frequency density=2 PRBs). The frequency density=4 PRBs is not supported. In contrast, the information element 2100 may be used to directly communicate different PTRS densities.

In view of the above, the disclosure relates in some aspects to a new extension type for modulation compression (e.g., with the combination of ExtType 4 or ExtType 5 fields along with a symbol mask). In some aspects, this technique may improve (e.g., reduce) the overhead of control plane messages by reducing the number of rows (sections) in the message. For example, an overhead reduction on the order of 70% (in terms of the number of rows) may be achieved.

In addition, the disclosure relates in some aspects to reducing the overhead of control plane messages for a continuous PRB allocation for a no compression scenario. In some aspects, this technique may improve (e.g., reduce) overhead by reducing the number of control plane messages. For example, an overhead reduction on the order of 50% (in terms of the number of control plane messages) may be achieved. This reduction in the number of control plane message may also reduce associated processing overhead.

Also in view of the above, the disclosure relates in some aspects to reducing the overhead of control plane messages for a continuous PRB allocation through the use of a new extension type (e.g., as shown in FIG. 21). Using this technique, overhead associated with rbgMask and rbgSize parameters may be avoided. Thus, an additional four bytes can be saved on top of the reduction in the number of control plane messages discussed above.

The techniques described above may be optional and implementation specific. Thus, they may be used with already implemented section extensions in ORAN and/or with section extensions developed in the future.

FIG. 22 is a signaling diagram 2200 illustrating an example of control plane signaling in a wireless communication system including a distributed unit (DU) 2202, a radio unit (RU) 2204, and a UE 2206. In some examples, the distributed unit 2202 may correspond to any of the DUs shown in any of FIGS. 4-6 and 23, or to any of the base stations or scheduling entities shown in any of FIGS. 1, 2, 4, 5, 6, and 27. In some examples, the radio unit 2204 may correspond to any of the RUs shown in any of FIGS. 4-6 and 23, or to any of the scheduled entities, base stations, or scheduling entities shown in any of FIGS. 1, 2, 4, 5, 6, and 27. In some examples, the UE 2206 may correspond to any of the UEs or scheduled entities shown in any of FIGS. 1, 2, 4, 5, and 23.

At 2208 of FIG. 22, the distributed unit 2202 transmits (e.g., via a wireless transceiver or wired transceiver) scheduling information to the radio unit 2204. For example, the distributed unit 2202 may transmit an indication of a resource allocation that the radio unit 2204 is to use for transmitting information to and/or receiving information from the UE 2206.

At 2210, the distributed unit 2202 transmits (e.g., via a wireless transceiver or wired transceiver) an information element that includes a symbol mask to the radio unit 2204. For example, the distributed unit 2202 may transmit any of the control plane messages 804, 1004, 1204, 1404, 1604, 1804, 1904 shown in FIGS. 8, 10, 12, 14, 16, 18, and 19 or any of the information elements 2000 or 2100 shown in FIGS. 20 and 21.

At 2212, the radio unit 2204 identifies the resources to be used for one or more channels (e.g., PDSCH, PDCCH, DMRS, CSI-RS, PTRS, PUSCH, PUCCH, etc.) to be used for the communication to/from the UE 2206. For example, the radio unit 2204 may determine, from the information element received at 2210, that certain REs in certain symbols are to be used for PDSCH, for DMRS, etc., as discussed above in conjunction with FIGS. 7-21.

At optional 2214, the radio unit 2204 may determine the modulation scheme to be used for the channel(s) identified at 2212. For example, the radio unit 2204 may determine, from the information element received at 2210, a modulation compression scaler value specified for one or more REs of a symbol as discussed above in conjunction with FIGS. 7-12.

At 2216, the radio unit 2204 sends a DCI to the UE 2206 indicating the resources identified at 2212 and, if applicable, the modulation information determined at 2214. The radio unit 2204 then communicates with the UE 2206 via these resources at 2218.

Figure 23:
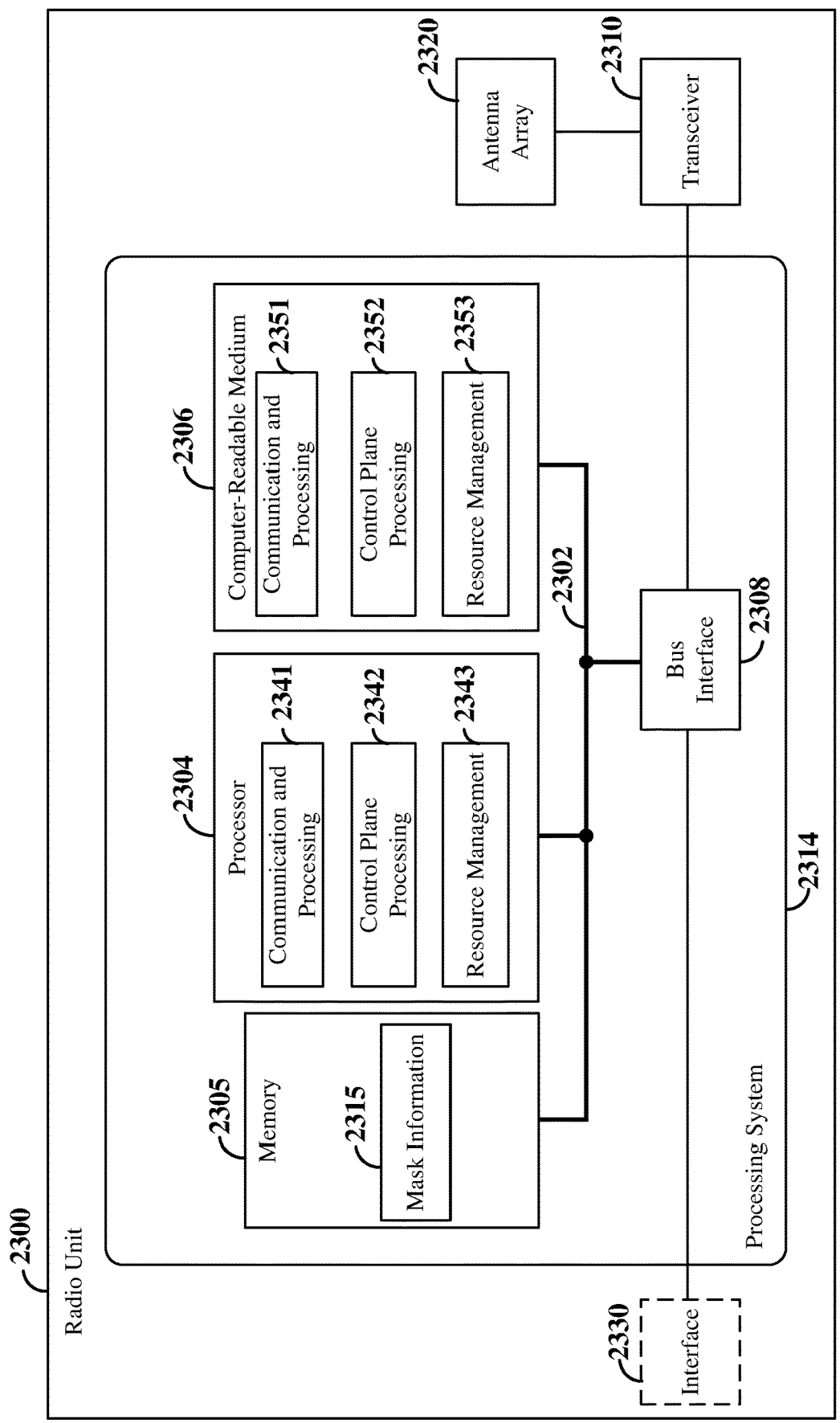
FIG. 23 is a block diagram illustrating an example of a hardware implementation for a radio unit employing a processing system according to some aspects.

FIG. 23 is a block diagram illustrating an example of a hardware implementation for a radio unit 2300 employing a processing system 2314. The radio unit 2300 may be configured to wirelessly communicate with a UE, as discussed in any one or more of FIGS. 1-22. In some examples, the radio unit may be equivalently referred to as a radio device, a TRP, a scheduled entity, a network node, a scheduling entity, a base station, or referenced in some other manner In some implementations, the radio unit 2300 may correspond to any of the RUs shown in any of FIGS. 4-6 and 22, or to any of the scheduled entities, base stations (e.g., eNBs and/or gNBs), or scheduling entities shown in any of FIGS. 1, 2, 4, 5, and 6.

In accordance with various aspects of the disclosure, an element, or any portion of an element, or any combination of elements may be implemented with the processing system 2314. The processing system 2314 may include one or more processors 2304. Examples of processors 2304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the radio unit 2300 may be configured to perform any one or more of the functions described herein. That is, the processor 2304, as utilized in a radio unit 2300, may be used to implement any one or more of the processes and procedures described herein.

In this example, the processing system 2314 may be implemented with a bus architecture, represented generally by the bus 2302. The bus 2302 may include any number of interconnecting buses and bridges depending on the specific application of the processing system 2314 and the overall design constraints. The bus 2302 communicatively couples together various circuits including one or more processors (represented generally by the processor 2304), a memory 2305, and computer-readable media (represented generally by the computer-readable medium 2306). The bus 2302 may also link various other circuits such as timing sources, peripherals, voltage regulators, and power management circuits, which are well known in the art, and therefore, will not be described any further. A bus interface 2308 provides an interface between the bus 2302 and a transceiver 2310, and an interface between the bus 2302 and an interface 2330. The transceiver 2310 provides a communication interface or means for communicating with various other apparatus over a wireless transmission medium. The interface 2330 provides a communication interface or means of communicating with various other apparatuses and devices (e.g., other devices housed within the same apparatus as the radio unit or other external apparatuses) over an internal bus or external transmission medium, such as an Ethernet cable. Depending upon the nature of the apparatus, the interface 2330 may include a user interface. Of course, such a user interface is optional, and may be omitted in some examples.

The processor 2304 is responsible for managing the bus 2302 and general processing, including the execution of software stored on the computer-readable medium 2306. The software, when executed by the processor 2304, causes the processing system 2314 to perform the various functions described below for any particular apparatus. The computer-readable medium 2306 and the memory 2305 may also be used for storing data that is manipulated by the processor 2304 when executing software. For example, the memory 2305 may store mask information 2315 (e.g., symbol masks, etc.) used by the processor 2304 in cooperation with the transceiver 2310 for the C-plane operations described herein.

One or more processors 2304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 2306.

The computer-readable medium 2306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 2306 may reside in the processing system 2314, external to the processing system 2314, or distributed across multiple entities including the processing system 2314. The computer-readable medium 2306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The radio unit 2300 may be configured to perform any one or more of the operations described herein (e.g., as described above in conjunction with FIGS. 1-22 and as described below in conjunction with FIGS. 24-26). In some aspects of the disclosure, the processor 2304, as utilized in the radio unit 2300, may include circuitry configured for various functions.

The processor 2304 may include communication and processing circuitry 2341. The communication and processing circuitry 2341 may include one or more hardware components that provide the physical structure that performs various processes related to wireless communication (e.g., signal reception and/or signal transmission) as described herein. The communication and processing circuitry 2341 may further include one or more hardware components that provide the physical structure that performs various processes related to signal processing (e.g., processing a received signal and/or processing a signal for transmission) as described herein. In some examples, the communication and processing circuitry 2341 may include two or more transmit/receive chains, each configured to process signals in a different RAT (or RAN) type. The communication and processing circuitry 2341 may further be configured to execute communication and processing software 2351 included on the computer-readable medium 2306 to implement one or more functions described herein.

The communication and processing circuitry 2341 may further be configured to communicate with a distributed unit via a first link (e.g., a fronthaul link) and a set of one or more child nodes (e.g., UEs) via respective second links (e.g., access links) In some examples, the communication and processing circuitry 2341 may further be configured to communicate with a child node via a fronthaul link In some implementations where the communication involves receiving information, the communication and processing circuitry 2341 may obtain information from a component of the radio unit 2300 (e.g., from the transceiver 2310 that receives the information via radio frequency signaling or some other type of signaling suitable for the applicable communication medium), process (e.g., decode) the information, and output the processed information. For example, the communication and processing circuitry 2341 may output the information to another component of the processor 2304, to the memory 2305, or to the bus interface 2308. In some examples, the communication and processing circuitry 2341 may receive one or more of signals, messages, other information, or any combination thereof. In some examples, the communication and processing circuitry 2341 may receive information via one or more channels. In some examples, the communication and processing circuitry 2341 may include functionality for a means for receiving. In some examples, the communication and processing circuitry 2341 may include functionality for a means for decoding.

In some implementations where the communication involves sending (e.g., transmitting) information, the communication and processing circuitry 2341 may obtain information (e.g., from another component of the processor 2304, the memory 2305, or the bus interface 2308), process (e.g., encode) the information, and output the processed information. For example, the communication and processing circuitry 2341 may output the information to the transceiver 2310 (e.g., that transmits the information via radio frequency signaling or some other type of signaling suitable for the applicable communication medium). In some examples, the communication and processing circuitry 2341 may send one or more of signals, messages, other information, or any combination thereof. In some examples, the communication and processing circuitry 2341 may send information via one or more channels. In some examples, the communication and processing circuitry 2341 may include functionality for a means for sending (e.g., means for transmitting). In some examples, the communication and processing circuitry 2341 may include functionality for a means for encoding.

The processor 2304 may include control plane processing circuitry 2342 configured to perform control plane processing-related operations as discussed herein (e.g., receiving a control plane message and obtaining a symbol mask from the control plane message). The control plane processing circuitry 2342 may be configured to execute control plane processing software 2352 included on the computer-readable medium 2306 to implement one or more functions described herein.

The control plane processing circuitry 2342 may include functionality for a means for receiving a control message. For example, the control plane processing circuitry 2342 may be configured to receive a control plane message (e.g., the control plane message 804 shown in FIG. 8) from a distributed unit via a fronthaul link The control plane processing circuitry 2342 may include functionality for a means for obtaining at least one symbol mask. For example, the control plane processing circuitry 2342 may be configured to parse an extension type information element carried by a control plane message to extract a symbol mask.

The processor 2304 may include resource management circuitry 2343 configured to perform resource management-related operations as discussed herein (e.g., communicating via a time slot). The resource management circuitry 2343 may be configured to execute resource management software 2353 included on the computer-readable medium 2306 to implement one or more functions described herein.

The resource management circuitry 2343 may include functionality for a means for communicating information during a time slot. For example, the resource management circuitry 2343 may be configured to transmit information to a UE via the time slot or receive information from a UE via the time slot, where the information is modulated (or demodulated) according to a modulation compression parameter carried by the symbol mask.

Figure 24:
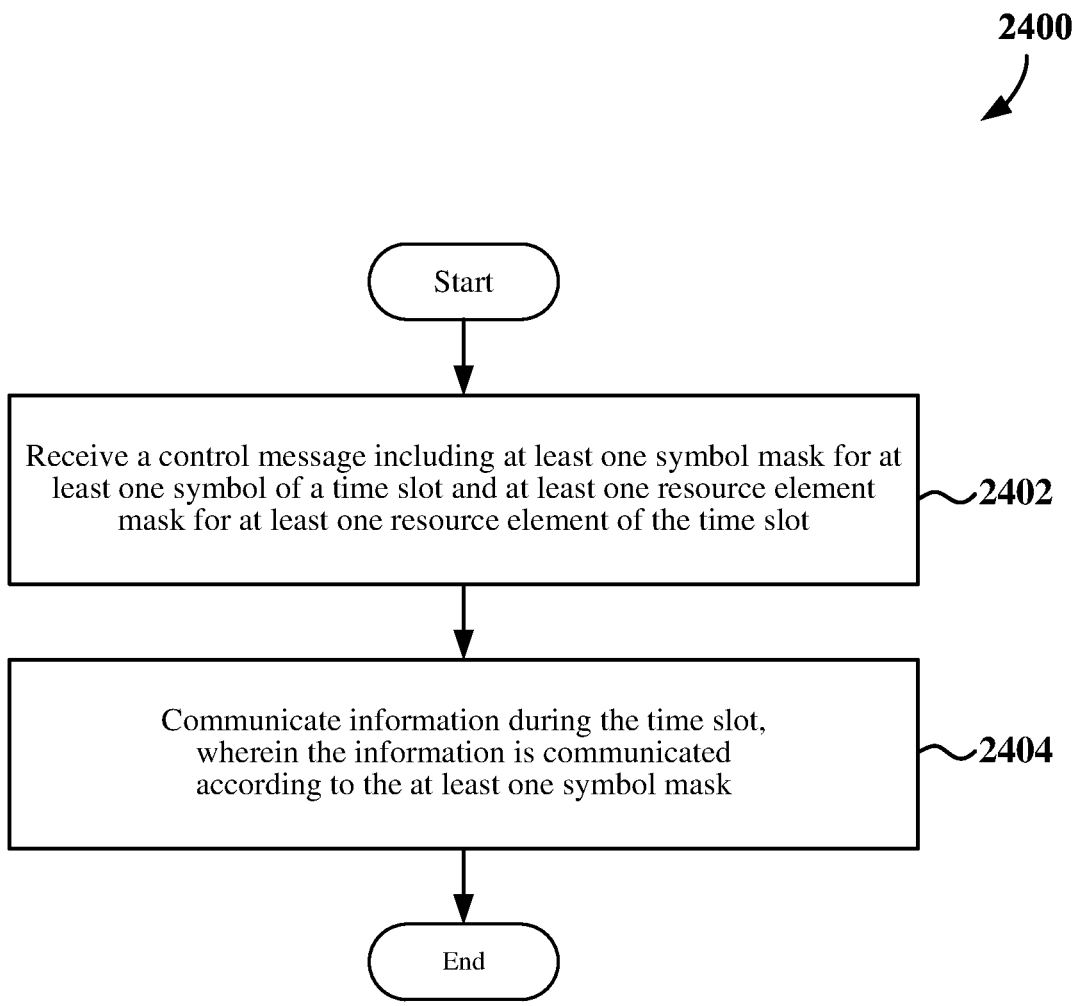
FIG. 24 is a flow chart of an example method for receiving a control message including a symbol mask according to some aspects.

FIG. 24 is a flow chart illustrating an example communication method 2400 in accordance with some aspects of the disclosure. As described below, some or all illustrated features may be omitted in a particular implementation within the scope of the disclosure, and some illustrated features may not be required for implementation of all examples. In some examples, the communication method 2400 may be carried out by the radio unit 2300 illustrated in FIG. 23. In some examples, the communication method 2400 may be carried out by any suitable apparatus or means for carrying out the functions or algorithm described below.

At block 2402, a radio unit may receive a control message including at least one symbol mask for at least one symbol of a time slot and at least one resource element mask for at least one resource element of the time slot. For example, the control plane processing circuitry 2342 together with the communication and processing circuitry 2341 and the transceiver 2310, shown and described above in connection with FIG. 23, may provide a means to receive a control message including at least one symbol mask for at least one symbol of a time slot and at least one resource element mask for at least one resource element of the time slot.

At block 2404, a radio unit may communicate information during the time slot, wherein the information is communicated according to the at least one symbol mask. For example, the control plane processing circuitry 2342 together with the communication and processing circuitry 2341 and the transceiver 2310, shown and described above in connection with FIG. 23, may provide a means to communicate information during the time slot, wherein the information is communicated according to the at least one symbol mask. In some examples, the information may include a downlink transmission to a user. In some examples, the information may include an uplink transmission from the user.

In some examples, the at least one symbol mask indicates at least one modulation compression parameter for the at least one symbol of the time slot. In some examples, the radio unit may use the at least one modulation compression parameter to modulate the information.

In some examples, the at least one symbol mask may include a first symbol mask that specifies a first modulation scaler value for a first set of symbols of the at least one symbol, and a second symbol mask that specifies a second modulation scaler value different from the first modulation scaler value for a second set of symbols of the at least one symbol, where the first set of symbols is different from the second set of symbols. In some examples, the control message may include a first section identifier for the first set of symbols and a second section identifier for the second set of symbols, wherein the first section identifier is different from the second section identifier. In some examples, the at least one symbol mask may include a third symbol mask that specifies the first modulation scaler value for the second set of symbols.

In some examples, the control message may include a first resource element mask that specifies a plurality of resource elements of the first set of symbols to which the first modulation scaler value is to be applied, a second resource element mask that specifies a first subset of resource elements of the second set of symbols to which the second modulation scaler value is to be applied, and a third resource element mask that specifies a second subset of resource elements of the second set of symbols to which the first modulation scaler value is to be applied, where the first subset of resource elements is different from the second subset of resource elements. In some examples, the second resource element mask and the third resource element mask are mutually exclusive. In some examples, the first modulation scaler value is for a quadrature amplitude modulation (QAM) scheme of a first QAM order, and the second modulation scaler value is for a QAM scheme of a second QAM order that is different from the first QAM order. In some examples, the first modulation scaler value is for a quadrature amplitude modulation (QAM) scheme of a first QAM order, where the first QAM order is any QAM order, and the second modulation scaler value is for a phase-shift keying (PSK) modulation QAM scheme of a second QAM order, where the second QAM order is any QAM order other than the first QAM order.

In some examples, the control message may be an open radio access network (ORAN) control plane message and the ORAN control plane message may include an application layer section extension that includes the at least one modulation compression parameter. In some examples, the application layer section extension may include an extension type with a symbol mask parameter and an extension type 4 information element, an extension type 5 information element, or a phase tracking reference signal frequency density parameter.

In some examples, the at least one symbol mask indicates a symbol allocation within a continuous set of resource blocks of the time slot. In some examples, the symbol allocation identifies symbols of the time slot that are allocated for a user.

In some examples, the at least one symbol mask may include a first symbol mask that specifies a first set of symbols for a first allocation of the symbol allocation and a second symbol mask that specifies a second set of symbols for a second allocation of the symbol allocation, where the first set of symbols and the second set of symbols are mutually exclusive. In some examples, the first set of symbols and the second set of symbols are noncontinuous. In some examples, the control message may include a first section identifier for the first set of symbols and a second section identifier for the second set of symbols, where the first section identifier is equal to the second section identifier.

In some examples, the control message may be an open radio access network (ORAN) control plane message, and the ORAN control plane message may include an application layer section extension for a resource allocation that includes the at least one symbol mask. In some examples, the application layer section extension does not include a resource block size parameter and a resource block group mask. In some examples, the application layer section extension may include an extension type 6 information element. In some examples, the application layer section extension may include a phase tracking reference signal frequency density parameter. In some examples, the application layer section extension may include a resource block size parameter and a resource block group mask.

Figure 25:
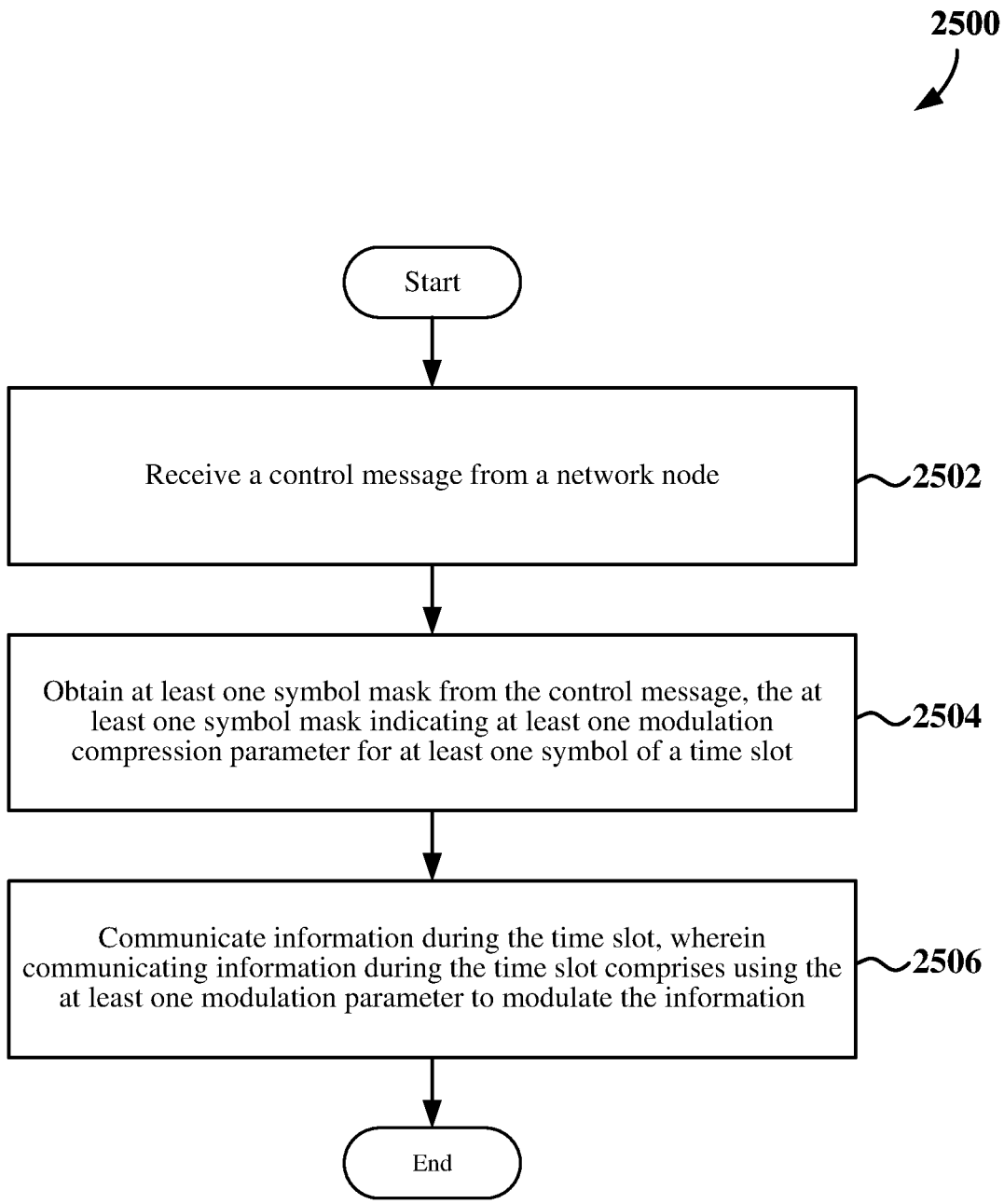
FIG. 25 is a flow chart of an example method for communicating a symbol mask according to some aspects.

FIG. 25 is a flow chart illustrating an example communication method 2500 in accordance with some aspects of the disclosure. In some examples, one or more aspects of the communication method 2500 may be used in conjunction with (e.g., as part of and/or in addition to) the communication method 2400 of FIG. 24. As described below, some or all illustrated features may be omitted in a particular implementation within the scope of the disclosure, and some illustrated features may not be required for implementation of all examples. In some examples, the communication method 2500 may be carried out by the radio unit 2300 illustrated in FIG. 23. In some examples, the communication method 2500 may be carried out by any suitable apparatus or means for carrying out the functions or algorithm described below.

At block 2502, a radio unit may receive a control message from a network node. For example, the control plane processing circuitry 2342 together with the communication and processing circuitry 2341 and the transceiver 2310, shown and described above in connection with FIG. 23, may provide a means to receive a control message from a network node.

In some examples, the control message may include an open radio access network (ORAN) control plane message. In some examples, the ORAN control plane message may include an application layer section extension that includes the at least one modulation compression parameter.

At block 2504, the radio unit may obtain at least one symbol mask from the control message where the at least one symbol mask may indicate at least one modulation compression parameter for at least one symbol of a time slot. For example, the control plane processing circuitry 2342, shown and described above in connection with FIG. 23, may provide a means to obtain at least one symbol mask from the control message.

At block 2506, the radio unit may communicate information during the time slot where communicating information during the time slot may include using the at least one modulation compression parameter to modulate the information. In some examples, communicating information during the time slot may include transmitting downlink information to a user, or receiving uplink information from the user. For example, the resource management circuitry 2343 together with the communication and processing circuitry 2341 and the transceiver 2310, shown and described above in connection with FIG. 23, may provide a means to communicate information during the time slot.

In some examples, the at least one symbol mask may include a first symbol mask (e.g., in a first row) that specifies a first modulation scaler value (e.g., a 64 QAM scaler) for a first set of symbols (e.g., 0-2, 4-6, etc.) of the at least one symbol. In some examples, the at least one symbol mask may include a second symbol mask (e.g., in a second row) that specifies a second modulation scaler value (e.g., a QPSK scaler) different from the first modulation scaler value for a second set of symbols (e.g., 3, 7, etc.) of the at least one symbol, wherein the first set of symbols is different from the second set of symbols.

In some examples, the control message may further include a first section identifier for the first set of symbols, and a second section identifier for the second set of symbols, wherein the first section identifier is different from the second section identifier.

In some examples, the at least one symbol mask may include a third symbol mask (e.g., in a third row) that specifies the first modulation scaler value for the second set of symbols. In some examples, the control message may further include a first resource element mask (e.g., reMask in row 1) that specifies a plurality of resource elements (e.g., REs 0-11) of the first set of symbols to which the first modulation scaler value is to be applied, a second resource element mask (e.g., reMask in row 2) that specifies a first subset of resource elements (e.g., REs 0, 2, 4, etc.) of the second set of symbols to which the second modulation scaler value is to be applied, and a third resource element mask (e.g., reMask in row 3) that specifies a second subset of resource elements (e.g., REs 1, 3, 5, etc.) of the second set of symbols to which the first modulation scaler value is to be applied, wherein the first subset of resource elements is different from the second subset of resource elements. In some examples, the second resource element mask and the third resource element mask are mutually exclusive.

In some examples, the first modulation scaler value is for a quadrature amplitude modulation (QAM) scheme, and the second modulation scaler value is for a phase-shift keying (PSK) modulation scheme. In some examples, the first modulation scaler value is for a quadrature amplitude modulation (QAM) scheme of a first QAM order, wherein the first QAM order is any QAM order (e.g., 1 or 2 or 3 or 4, etc.). In some examples, the second modulation scaler value is for a phase-shift keying (PSK) modulation QAM scheme of a second QAM order, wherein the second QAM order is any QAM order other than the first QAM order (e.g., if the first QAM order is 2, the second QAM order may be 1 or 3 or 4 or 5, etc.).

Figure 26:
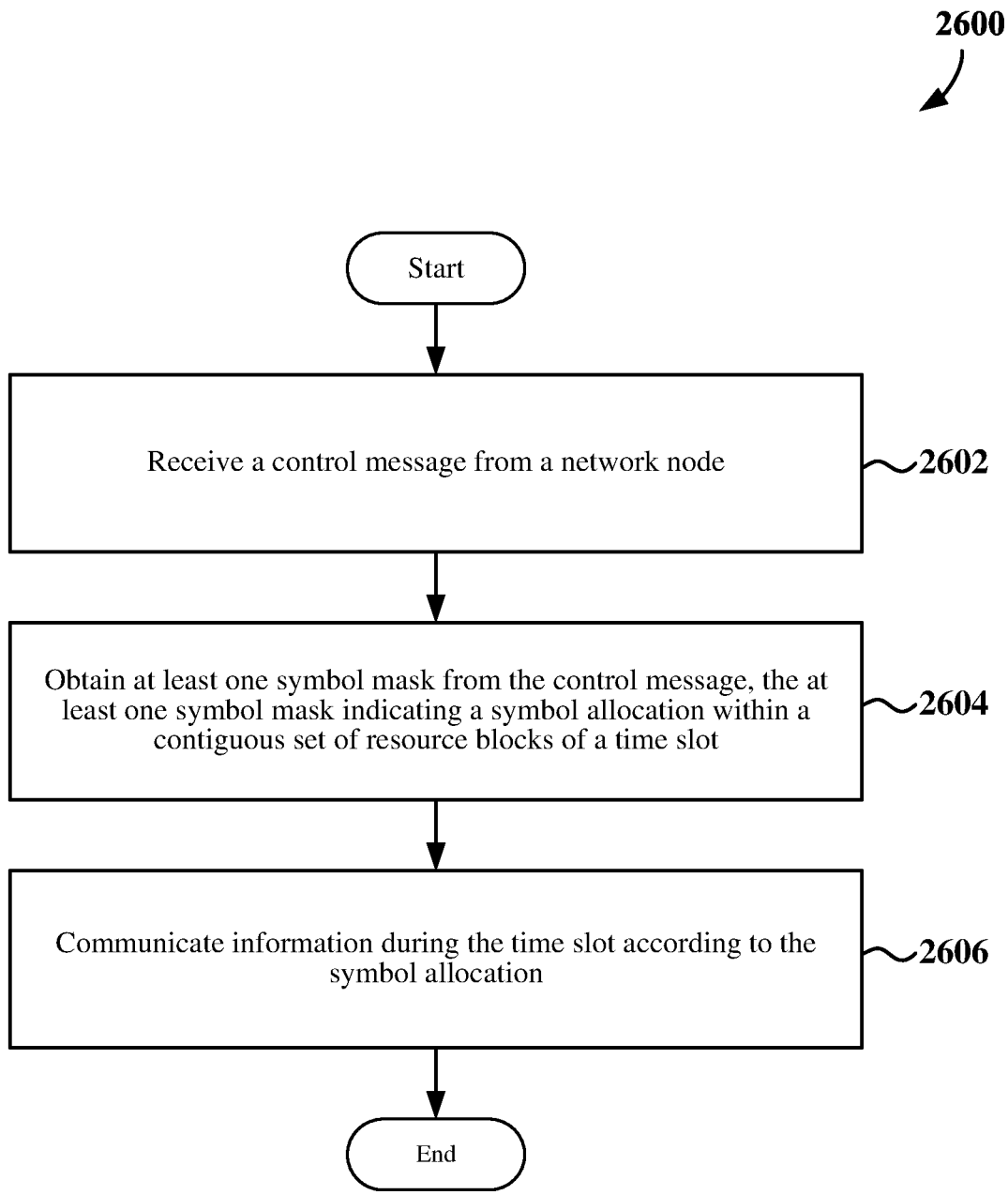
FIG. 26 is a flow chart of another example method for communicating a symbol mask according to some aspects.

FIG. 26 is a flow chart illustrating an example communication method 2600 in accordance with some aspects of the disclosure. In some examples, one or more aspects of the communication method 2600 may be used in conjunction with (e.g., as part of and/or in addition to) the communication method 2400 of FIG. 24. As described below, some or all illustrated features may be omitted in a particular implementation within the scope of the disclosure, and some illustrated features may not be required for implementation of all examples. In some examples, the communication method 2600 may be carried out by the radio unit 2300 illustrated in FIG. 23. In some examples, the communication method 2600 may be carried out by any suitable apparatus or means for carrying out the functions or algorithm described below.

At block 2602, a radio unit may receive a control message (e.g., the control plane message 1904 shown in FIG. 19) from a network node. For example, the control plane processing circuitry 2342 together with the communication and processing circuitry 2341 and the transceiver 2310, shown and described above in connection with FIG. 23, may provide a means to receive a control message.

At block 2604, the radio unit may obtain at least one symbol mask from the control message where the at least one symbol mask may indicate a symbol allocation within a continuous set of resource blocks of a time slot. In some examples, the symbol allocation identifies symbols of the time slot that are allocated for a user. For example, the control plane processing circuitry 2342, shown and described above in connection with FIG. 23, may provide a means to obtain at least one symbol mask from the control message.

At block 2606, the radio unit may communicate information during the time slot according to the symbol allocation. In some examples, communicating information during the time slot may include transmitting downlink information to the user, or receiving uplink information from the user. For example, the resource management circuitry 2343 together with the communication and processing circuitry 2341 and the transceiver 2310, shown and described above in connection with FIG. 23, may provide a means to communicate information during the time slot according to the symbol allocation.

In some examples, the at least one symbol mask may include a first symbol mask (e.g., in a first row) that specifies a first set of symbols for a first allocation. In some examples, the at least one symbol mask may include a second symbol mask (e.g., in a second row) that specifies a second set of symbols for a second allocation, wherein the first set of symbols and the second set of symbols are mutually exclusive. In some examples, the first set of symbols and the second set of symbols are noncontinuous.

In some examples, the control message may further include a first section identifier for the first set of symbols. In some examples, the control message may further include a second section identifier for the second set of symbols, wherein the first section identifier is equal to the second section identifier.

In some examples, the control message may include an open radio access network (ORAN) control plane message. In some examples, the ORAN control plane message may include an application layer section extension (e.g., a new ExtType or ExtType=6) for a resource allocation that includes the at least one symbol mask. In some examples, the application layer section extension does not include a resource block size parameter (e.g., rbgSize) and a resource block group mask (e.g., rbgMask). In some examples, the application layer section extension may include an ExtType 6 information element.

In one configuration, the radio unit 2300 includes means for receiving a control message comprising at least one symbol mask for at least one symbol of a time slot and at least one resource element mask for at least one resource element of the time slot, and means for communicating information during the time slot, wherein the information is communicated according to the at least one symbol mask. In one aspect, the aforementioned means may be the processor 2304 shown in FIG. 23 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 2304 is merely provided as an example, and other means for carrying out the described functions may be included within various aspects of the present disclosure, including but not limited to the instructions stored in the computer-readable medium 2306, or any other suitable apparatus or means described in any one or more of FIGS. 1, 2, 4-6, 22, and 23, and utilizing, for example, the methods and/or algorithms described herein in relation to FIGS. 24-26.

Figure 27:
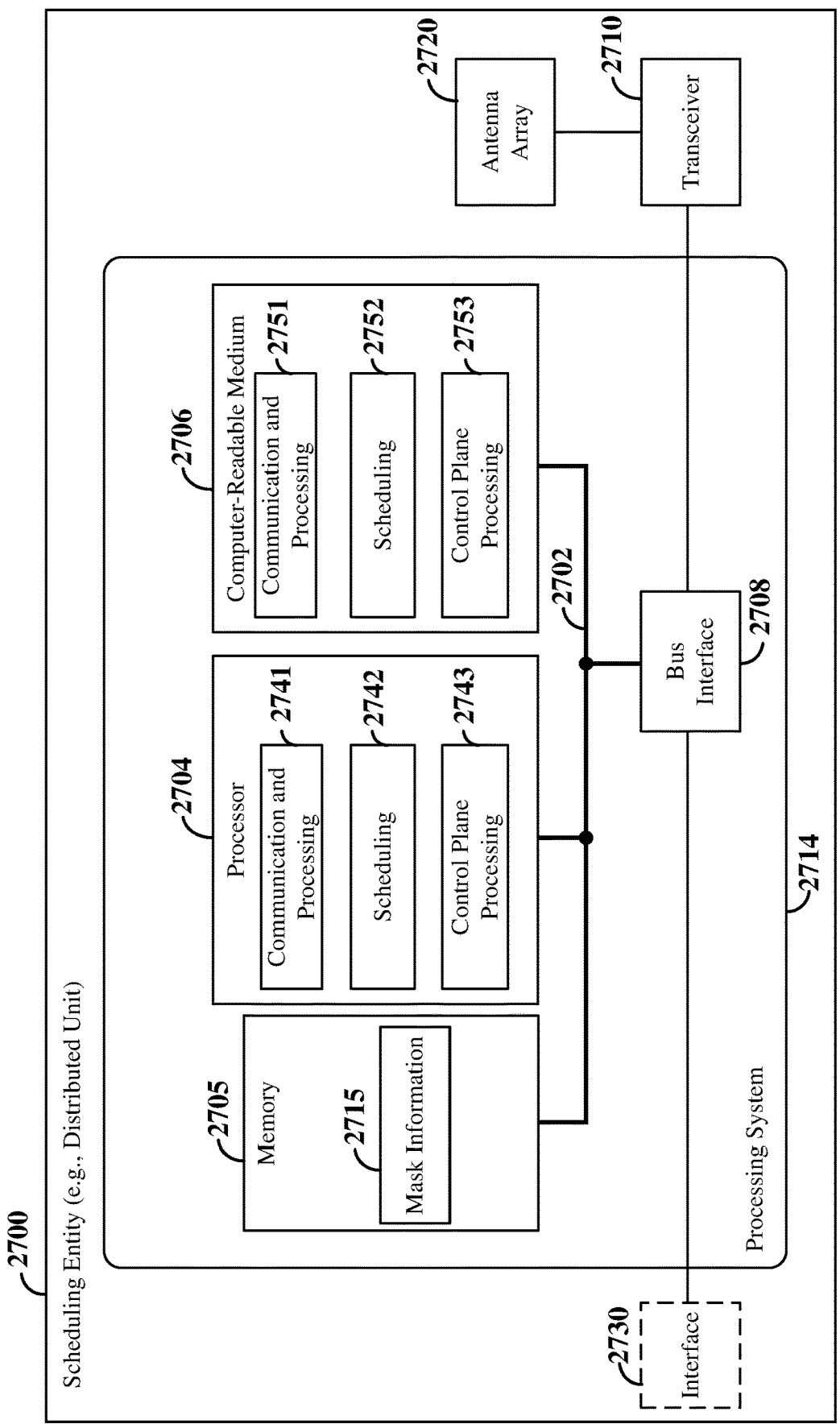
FIG. 27 is a block diagram illustrating an example of a hardware implementation for a scheduling entity (e.g., a distributed unit) employing a processing system according to some aspects.

FIG. 27 is a conceptual diagram illustrating an example of a hardware implementation for a scheduling entity 2700 employing a processing system 2714. In some examples, the scheduling entity 2700 may be equivalently referred to as distributed unit, a network node, a network device, a base station, or referenced in some other manner In some implementations, the scheduling entity 2700 may correspond to any of the DUs shown in any of FIGS. 4-6 and 22, or to any of the base stations (e.g., eNBs and/or gNBs) or scheduling entities shown in any of FIGS. 1, 2, 4, 5, and 6.

In accordance with various aspects of the disclosure, an element, or any portion of an element, or any combination of elements may be implemented with the processing system 2714. The processing system 2714 may include one or more processors 2704. The processing system 2714 may be substantially the same as the processing system 2314 illustrated in FIG. 23, including a bus interface 2708, a bus 2702, memory 2705, a processor 2704, and a computer-readable medium 2706. For example, the memory 2705 may store mask information 2715 (e.g., symbol masks, etc.) used by the processor 2704 in cooperation with the transceiver 2610 for the C-plane operations described herein. Furthermore, the scheduling entity 2700 may include an interface 2730 (e.g., a network interface) that provides a means for communicating with at least one other apparatus within a core network and with at least one radio access network.

The scheduling entity 2700 may be configured to perform any one or more of the operations described herein (e.g., as described above in conjunction with FIGS. 1-22 and as described below in conjunction with FIGS. 28-30). In some aspects of the disclosure, the processor 2704, as utilized in the scheduling entity 2700, may include circuitry configured for various functions.

The processor 2704 may be configured to generate, schedule, and modify a resource assignment or grant of time-frequency resources (e.g., a set of one or more resource elements). For example, the processor 2704 may schedule time-frequency resources within a plurality of time division duplex (TDD) and/or frequency division duplex (FDD) subframes, slots, and/or mini-slots to carry user data traffic and/or control information to and/or from multiple UEs. The processor 2704 may be configured to schedule resources for the transmission of a downlink signal. The processor 2704 may further be configured to schedule resources for the transmission of an uplink signal.

The processor 2704 may include communication and processing circuitry 2741. The communication and processing circuitry 2741 may include one or more hardware components that provide the physical structure that performs various processes related to communication (e.g., signal reception and/or signal transmission) as described herein. The communication and processing circuitry 2741 may further include one or more hardware components that provide the physical structure that performs various processes related to signal processing (e.g., processing a received signal and/or processing a signal for transmission) as described herein. The communication and processing circuitry 2741 may further be configured to execute communication and processing software 2751 included on the computer-readable medium 2706 to implement one or more functions described herein.

In examples where scheduling entity 2700 is a distributed unit, the communication and processing circuitry 2741 may be configured to communicate with a radio unit via a fronthaul link. In some implementations, the communication and processing circuitry 2741 may be configured to communicate with a parent node via one or more midhaul and/or backhaul links.

In some implementations where the communication involves receiving information, the communication and processing circuitry 2741 may obtain information from a component of the scheduling entity 2700 (e.g., from the transceiver 2710 that receives the information via radio frequency signaling or some other type of signaling suitable for the applicable communication medium), process (e.g., decode) the information, and output the processed information. For example, the communication and processing circuitry 2741 may output the information to another component of the processor 2704, to the memory 2705, or to the bus interface 2708. In some examples, the communication and processing circuitry 2741 may receive one or more of signals, messages, other information, or any combination thereof. In some examples, the communication and processing circuitry 2741 may receive information via one or more channels. In some examples, the communication and processing circuitry 2741 may include functionality for a means for receiving.

In some implementations where the communication involves sending (e.g., transmitting) information, the communication and processing circuitry 2741 may obtain information (e.g., from another component of the processor 2704, the memory 2705, or the bus interface 2708), process (e.g., encode) the information, and output the processed information. For example, the communication and processing circuitry 2741 may output the information to the transceiver 2710 (e.g., that transmits the information via radio frequency signaling or some other type of signaling suitable for the applicable communication medium). In some examples, the communication and processing circuitry 2741 may send one or more of signals, messages, other information, or any combination thereof. In some examples, the communication and processing circuitry 2741 may send information via one or more channels. In some examples, the communication and processing circuitry 2741 may include functionality for a means for sending (e.g., means for transmitting).

The processor 2704 may include scheduling circuitry 2742 configured to perform scheduling-related operations as discussed herein (e.g., communicating scheduling of a time slot for a user). The scheduling circuitry 2742 may be configured to execute scheduling software 2752 included on the computer-readable medium 2706 to implement one or more functions described herein.

The scheduling circuitry 2742 may include functionality for a means for generating a control message. For example, the scheduling circuitry 2742 may be configured to specify which symbols and REs in a time slot are to carry one type of information (e.g., PDSCH) and which symbols and REs in the time slot are to carry another type of information (e.g., DMRS), where the time slot may be allocated for uplink transmissions from a UE or downlink transmission to the UE.

The scheduling circuitry 2742 may include functionality for a means for transmitting an indication of a schedule time slot. For example, the scheduling circuitry 2742 may be configured to transmit a control plane message including scheduling information to a radio unit.

The processor 2704 may include control plane processing circuitry 2743 configured to perform control plane processing-related operations as discussed herein (e.g., generating a symbol mask and sending a control plane message including the symbol mask to a radio unit). The control plane processing circuitry 2743 may be configured to execute control plane processing software 2753 included on the computer-readable medium 2706 to implement one or more functions described herein.

The control plane processing circuitry 2743 may include functionality for a means for generating a control message. For example, the control plane processing circuitry 2743 may be configured to generate a control plane message with an extension type information element that includes a symbol mask (e.g., the control plane message 804 shown in FIG. 8).

The control plane processing circuitry 2743 may include functionality for a means for transmitting a control message. For example, the control plane processing circuitry 2743 may be configured to send a control plane message to a radio unit via a fronthaul link FIG. 28 is a flow chart illustrating an example communication method 2800 in accordance with some aspects of the disclosure. As described below, some or all illustrated features may be omitted in a particular implementation within the scope of the disclosure, and some illustrated features may not be required for implementation of all examples. In some examples, the communication method 2800 may be carried out by the scheduling entity 2700 illustrated in FIG. 27. In some examples, the communication method 2800 may be carried out by any suitable apparatus or means for carrying out the functions or algorithm described below.

At block 2802, a scheduling entity may transmit an indication of a time slot to a radio unit. For example, the scheduling circuitry 2742 together with the communication and processing circuitry 2741 and the transceiver 2710, shown and described above in connection with FIG. 27, may provide a means to transmit an indication of a time slot to a radio unit.

At block 2804, the scheduling entity may transmit a control message including at least one symbol mask for at least one symbol of the time slot and at least one resource element mask for at least one resource element of the time slot to the radio unit. For example, the scheduling circuitry 2742 together with the communication and processing circuitry 2741 and the transceiver 2710, shown and described above in connection with FIG. 27, may provide a means to transmit a control message including at least one symbol mask for at least one symbol of the time slot and at least one resource element mask for at least one resource element of the time slot to the radio unit.

In some examples, the at least one symbol mask indicates at least one modulation compression parameter for the at least one symbol of the time slot.

In some examples, the at least one symbol mask may include a first symbol mask that specifies a first modulation scaler value for a first set of symbols of the at least one symbol, and a second symbol mask that specifies a second modulation scaler value different from the first modulation scaler value for a second set of symbols of the at least one symbol, where the first set of symbols is different from the second set of symbols. In some examples, the control message may include a first section identifier for the first set of symbols and a second section identifier for the second set of symbols, wherein the first section identifier is different from the second section identifier. In some examples, the at least one symbol mask may include a third symbol mask that specifies the first modulation scaler value for the second set of symbols.

In some examples, the control message may include a first resource element mask that specifies a plurality of resource elements of the first set of symbols to which the first modulation scaler value is to be applied, a second resource element mask that specifies a first subset of resource elements of the second set of symbols to which the second modulation scaler value is to be applied, and a third resource element mask that specifies a second subset of resource elements of the second set of symbols to which the first modulation scaler value is to be applied, where the first subset of resource elements is different from the second subset of resource elements. In some examples, the second resource element mask and the third resource element mask are mutually exclusive. In some examples, the first modulation scaler value is for a quadrature amplitude modulation (QAM) scheme of a first QAM order, where the first QAM order is any QAM order, and the second modulation scaler value is for a phase-shift keying (PSK) modulation QAM scheme of a second QAM order, where the second QAM order is any QAM order other than the first QAM order.

In some examples, the control message may be an open radio access network (ORAN) control plane message and the ORAN control plane message may include an application layer section extension that includes the at least one modulation compression parameter. In some examples, the application layer section extension may include an extension type with a symbol mask parameter and an extension type 4 information element, an extension type 5 information element, or a phase tracking reference signal frequency density parameter.

In some examples, the at least one symbol mask indicates a symbol allocation within a continuous set of resource blocks of the time slot. In some examples, the symbol allocation identifies symbols of the time slot that are allocated for the user.

In some examples, the at least one symbol mask may include a first symbol mask that specifies a first set of symbols for a first allocation of the symbol allocation and a second symbol mask that specifies a second set of symbols for a second allocation of the symbol allocation, where the first set of symbols and the second set of symbols are mutually exclusive. In some examples, the first set of symbols and the second set of symbols are noncontinuous. In some examples, the control message may include a first section identifier for the first set of symbols and a second section identifier for the second set of symbols, where the first section identifier is equal to the second section identifier.

In some examples, the control message may be an open radio access network (ORAN) control plane message, and the ORAN control plane message may include an application layer section extension for a resource allocation that includes the at least one symbol mask. In some examples, the application layer section extension does not include a resource block size parameter and a resource block group mask. In some examples, the application layer section extension may include an extension type 6 information element. In some examples, the application layer section extension may include a phase tracking reference signal frequency density parameter. In some examples, the application layer section extension may include a resource block size parameter and a resource block group mask.

Figure 28:
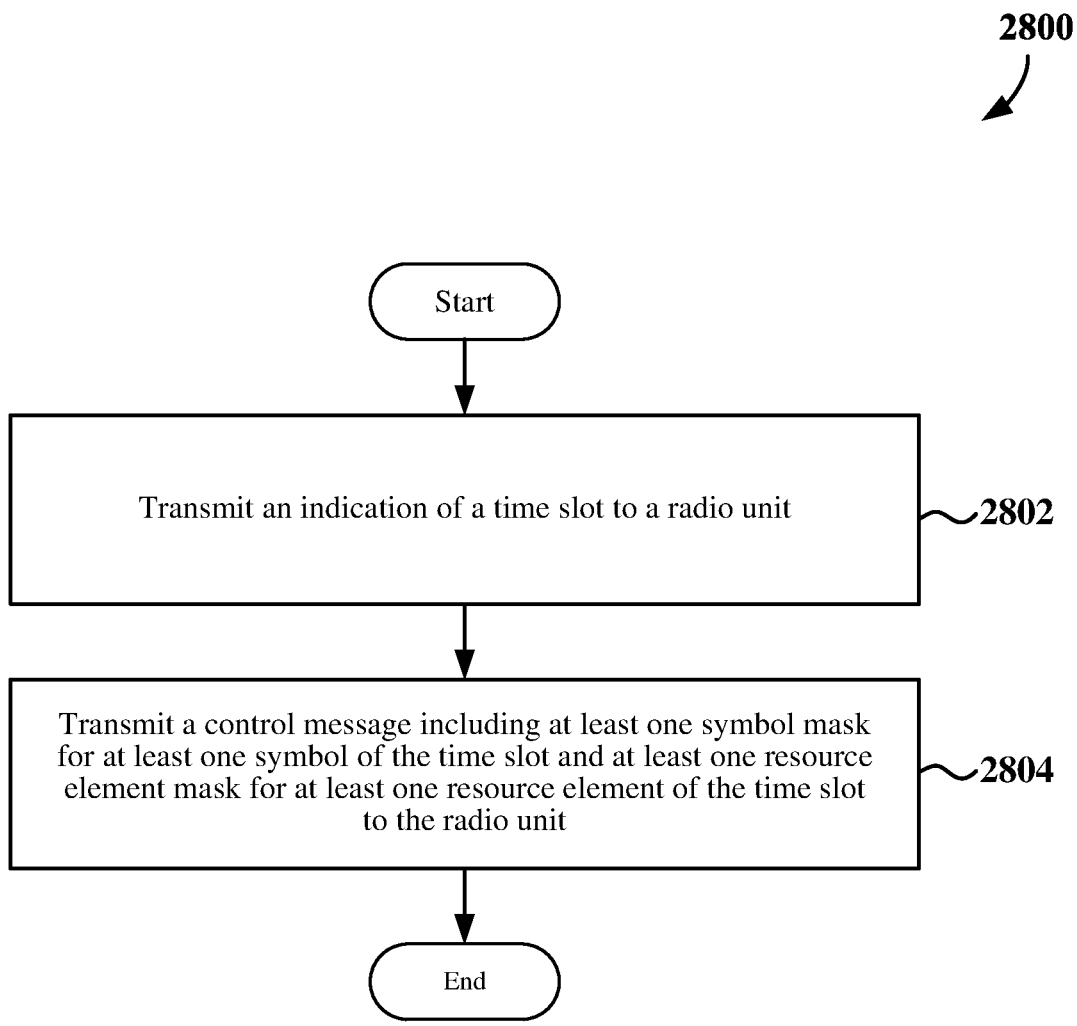
FIG. 28 is a flow chart of an example method for transmitting a control message including a symbol mask according to some aspects.
Figure 29:
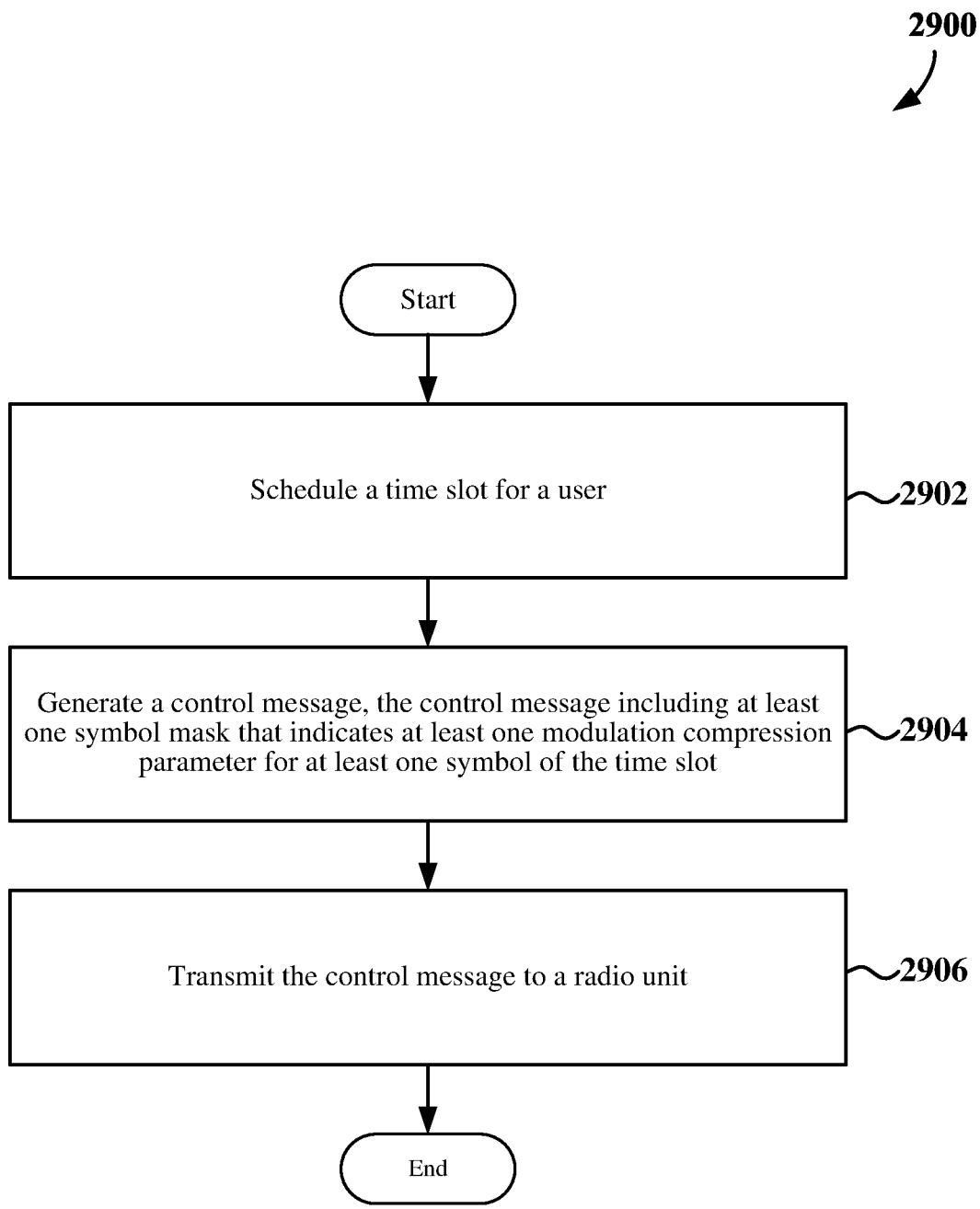
FIG. 29 is a flow chart of another example method for communicating a symbol mask according to some aspects.

FIG. 29 is a flow chart illustrating an example communication method 2900 in accordance with some aspects of the disclosure. In some examples, one or more aspects of the communication method 2900 may be used in conjunction with (e.g., as part of and/or in addition to) the communication method 2800 of FIG. 28. As described below, some or all illustrated features may be omitted in a particular implementation within the scope of the disclosure, and some illustrated features may not be required for implementation of all examples. In some examples, the communication method 2900 may be carried out by the scheduling entity 2700 illustrated in FIG. 27. In some examples, the communication method 2900 may be carried out by any suitable apparatus or means for carrying out the functions or algorithm described below.

At block 2902, a scheduling entity may schedule a time slot for a user. For example, the scheduling circuitry 2742, shown and described above in connection with FIG. 27, may provide a means to schedule a time slot for a user.

At block 2904, the scheduling entity may generate a control message where the control message may include at least one symbol mask that indicates at least one modulation compression parameter for at least one symbol of the time slot. For example, the control plane processing circuitry 2743, shown and described above in connection with FIG. 27, may provide a means to generate a control message.

In some examples, the control message may include an open radio access network (ORAN) control plane message. In some examples, the ORAN control plane message may include an application layer section extension that includes the at least one modulation compression parameter. In some examples, the application layer section extension may include an extension type with a symbol mask parameter and an ExtType 4 information element or an ExtType 5 information element.

At block 2906, the scheduling entity may transmit the control message to a radio unit. For example, the control plane processing circuitry 2743 together with the communication and processing circuitry 2741 and the transceiver 2710, shown and described above in connection with FIG. 27, may provide a means to transmit the control message to a radio unit.

In some examples, the at least one symbol mask may include a first symbol mask that specifies a first modulation scaler value for a first set of symbols of the at least one symbol. In some examples, the at least one symbol mask may include a second symbol mask that specifies a second modulation scaler value different from the first modulation scaler value for a second set of symbols of the at least one symbol, wherein the first set of symbols is different from the second set of symbols.

In some examples, the control message may further include a first section identifier for the first set of symbols. In some examples, the control message may further include a second section identifier for the second set of symbols, wherein the first section identifier is different from the second section identifier.

In some examples, the at least one symbol mask may include a third symbol mask that specifies the first modulation scaler value for the second set of symbols. In some examples, the control message may further include a first resource element mask that specifies a plurality of resource elements of the first set of symbols to which the first modulation scaler value is to be applied. In some examples, the control message may further include a second resource element mask that specifies a first subset of resource elements of the second set of symbols to which the second modulation scaler value is to be applied. In some examples, the control message may further include a third resource element mask that specifies a second subset of resource elements of the second set of symbols to which the first modulation scaler value is to be applied, wherein the first subset of resource elements is different from the second subset of resource elements. In some examples, the second resource element mask and the third resource element mask are mutually exclusive.

In some examples, the first modulation scaler value is for a quadrature amplitude modulation (QAM) scheme. In some examples, the second modulation scaler value is for a phase-shift keying (PSK) modulation scheme.

Figure 30:
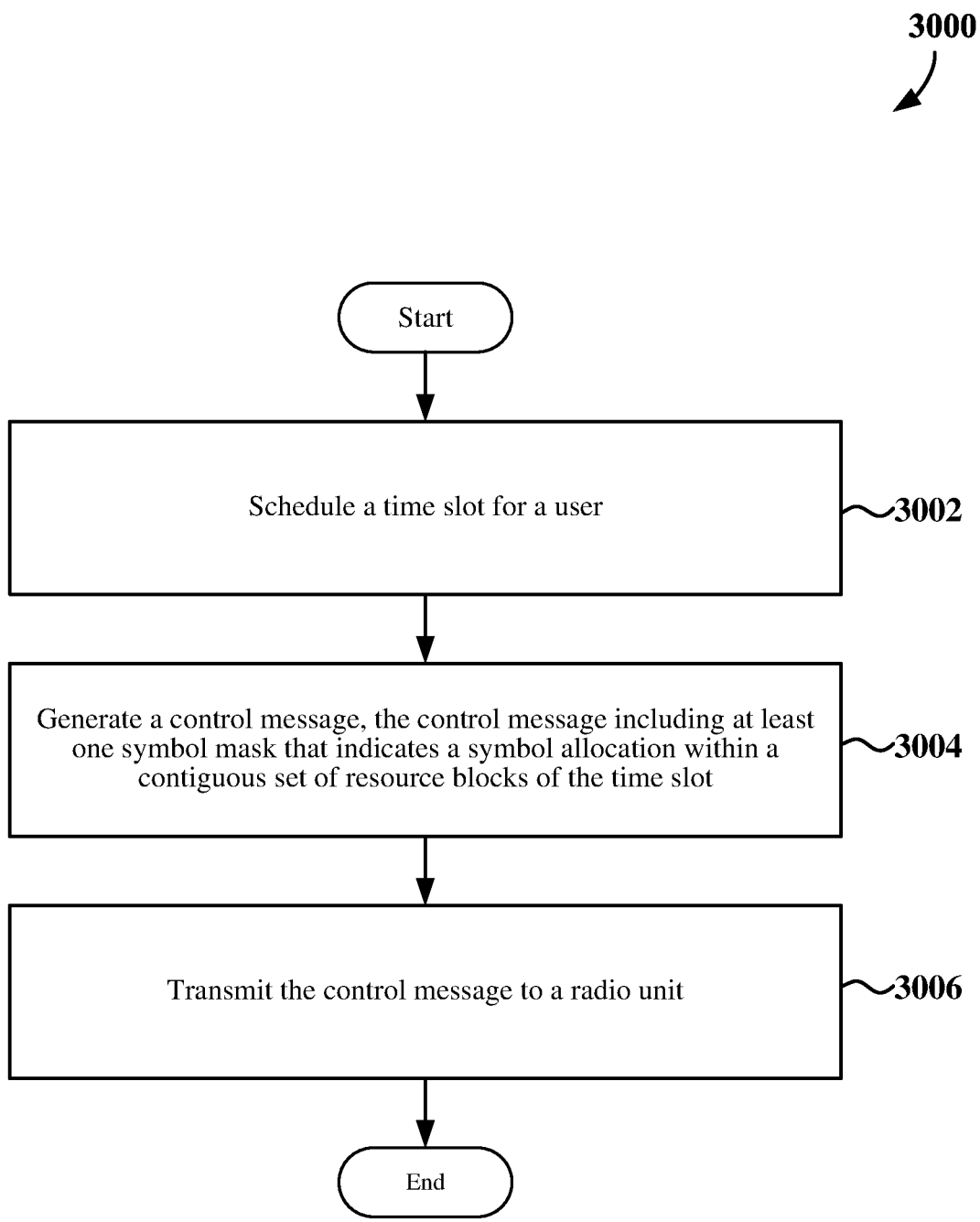
FIG. 30 is a flow chart of another example method for communicating a symbol mask according to some aspects.

FIG. 30 is a flow chart illustrating an example communication method 3000 in accordance with some aspects of the disclosure. In some examples, one or more aspects of the communication method 3000 may be used in conjunction with (e.g., as part of and/or in addition to) the communication method 2800 of FIG. 28. As described below, some or all illustrated features may be omitted in a particular implementation within the scope of the disclosure, and some illustrated features may not be required for implementation of all examples. In some examples, the communication method 3000 may be carried out by the scheduling entity 2700 illustrated in FIG. 27. In some examples, the communication method 3000 may be carried out by any suitable apparatus or means for carrying out the functions or algorithm described below.

At block 3002, a scheduling entity may schedule a time slot for a user. For example, the scheduling circuitry 2742, shown and described above in connection with FIG. 27, may provide a means to schedule a time slot for a user.

At block 3004, the scheduling entity may generate a control message where the control message may include at least one symbol mask that indicates a symbol allocation within a continuous set of resource blocks of the time slot. In some examples, the symbol allocation identifies symbols of the time slot that are allocated for the user. For example, the control plane processing circuitry 2743, shown and described above in connection with FIG. 27, may provide a means to generate a control message.

At block 3006, the scheduling entity may transmit the control message to a radio unit. For example, the control plane processing circuitry 2743 together with the communication and processing circuitry 2741 and the transceiver 2710, shown and described above in connection with FIG. 27, may provide a means to transmit the control message to a radio unit.

In some examples, the at least one symbol mask may include a first symbol mask that specifies a first set of symbols for a first allocation. In some examples, the at least one symbol mask may include a second symbol mask that specifies a second set of symbols for a second allocation, wherein the first set of symbols and the second set of symbols are mutually exclusive. In some examples, the first set of symbols and the second set of symbols are noncontinuous.

In some examples, the control message may further include a first section identifier for the first set of symbols. In some examples, the control message may further include a second section identifier for the second set of symbols, wherein the first section identifier is equal to the second section identifier.

In some examples, the control message may include an open radio access network (ORAN) control plane message. In some examples, the ORAN control plane message may include an application layer section extension for a resource allocation that includes the at least one symbol mask. In some examples, the application layer section extension does not include a resource block size parameter and a resource block group mask. In some examples, the application layer section extension may include an ExtType 6 information element. In some examples, the application layer section extension may include a resource block size parameter and a resource block group mask.

In one configuration, the scheduling entity 2700 includes means for transmitting an indication of a time slot to a radio unit, and means for transmitting a control message comprising at least one symbol mask for at least one symbol of the time slot to the radio unit and at least one resource element mask for at least one resource element of the time slot. In one aspect, the aforementioned means may be the processor 2704 shown in FIG. 27 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 2704 is merely provided as an example, and other means for carrying out the described functions may be included within various aspects of the present disclosure, including but not limited to the instructions stored in the computer-readable medium 2706, or any other suitable apparatus or means described in any one or more of FIGS. 1, 2, 4-6, 22, and 27, and utilizing, for example, the methods and/or algorithms described herein in relation to FIGS. 28-30.

In some examples, a method of communication at a network node may include scheduling a time slot for a user, generating a control message, and transmitting the control message to a radio unit. The control message may include at least one symbol mask that indicates at least one modulation compression parameter for at least one symbol of the time slot.

In some examples, a network node may include a transceiver, a memory, and a processor communicatively coupled to the transceiver and the memory. The processor and the memory may be configured to schedule a time slot for a user, generate a control message, and transmit the control message to a radio unit via the transceiver. The control message may include at least one symbol mask that indicates at least one modulation compression parameter for at least one symbol of the time slot.

In some examples, a network node may include means for scheduling a time slot for a user, means for generating a control message, and means for transmitting the control message to a radio unit. The control message may include at least one symbol mask that indicates at least one modulation compression parameter for at least one symbol of the time slot.

In some examples, an article of manufacture for use by a network node includes a non-transitory computer-readable medium having stored therein instructions executable by one or more processors of the network node to schedule a time slot for a user, generate a control message, and transmit the control message to a radio unit. The control message may include at least one symbol mask that indicates at least one modulation compression parameter for at least one symbol of the time slot.

In some examples, a method of communication at a radio unit may include receiving a control message from a network node and obtaining at least one symbol mask from the control message. The at least one symbol mask may indicate at least one modulation compression parameter for at least one symbol of a time slot. The method may also include communicating information during the time slot where communicating information during the time slot may include using the at least one modulation compression parameter to modulate the information.

In some examples, a radio unit may include a transceiver, a memory, and a processor communicatively coupled to the transceiver and the memory. The processor and the memory may be configured to receive a control message from a network node and obtain at least one symbol mask from the control message. The at least one symbol mask may indicate at least one modulation compression parameter for at least one symbol of a time slot. The processor and the memory may also be configured to communicate information during the time slot via the transceiver where communicating information during the time slot may include using the at least one modulation compression parameter to modulate the information.

In some examples, a radio unit may include means for receiving a control message from a network node and means for obtaining at least one symbol mask from the control message. The at least one symbol mask may indicate at least one modulation compression parameter for at least one symbol of a time slot. The wireless communication device may also include means for communicating information during the time slot where communicating information during the time slot may include using the at least one modulation compression parameter to modulate the information.

In some examples, an article of manufacture for use by a radio unit includes a non-transitory computer-readable medium having stored therein instructions executable by one or more processors of the radio unit to receive a control message from a network node and obtain at least one symbol mask from the control message. The at least one symbol mask may indicate at least one modulation compression parameter for at least one symbol of a time slot. The computer-readable medium may also have stored therein instructions executable by one or more processors of the wireless communication device to communicate information during the time slot where communicating information during the time slot may include using the at least one modulation compression parameter to modulate the information.

In some examples, a method of communication at a network node may include scheduling a time slot for a user, generating a control message, and transmitting the control message to a radio unit. The control message may include at least one symbol mask that indicates a symbol allocation within a continuous set of resource blocks of the time slot.

In some examples, a network node may include a transceiver, a memory, and a processor communicatively coupled to the transceiver and the memory. The processor and the memory may be configured to schedule a time slot for a user, generate a control message, and transmit the control message to a radio unit via the transceiver. The control message may include at least one symbol mask that indicates a symbol allocation within a continuous set of resource blocks of the time slot.

In some examples, a network node may include means for scheduling a time slot for a user, means for generating a control message, and means for transmitting the control message to a radio unit. The control message may include at least one symbol mask that indicates a symbol allocation within a continuous set of resource blocks of the time slot.

In some examples, an article of manufacture for use by a network node includes a non-transitory computer-readable medium having stored therein instructions executable by one or more processors of the network node to schedule a time slot for a user, generate a control message, and transmit the control message to a radio unit. The control message may include at least one symbol mask that indicates a symbol allocation within a continuous set of resource blocks of the time slot.

In some examples, a method of communication at a radio unit may include receiving a control message from a network node and obtaining at least one symbol mask from the control message. The at least one symbol mask may indicate a symbol allocation within a continuous set of resource blocks of a time slot. The method may also include communicating information during the time slot according to the symbol allocation.

In some examples, a radio unit may include a transceiver, a memory, and a processor communicatively coupled to the transceiver and the memory. The processor and the memory may be configured to receive a control message from a network node and obtain at least one symbol mask from the control message. The at least one symbol mask may indicate a symbol allocation within a continuous set of resource blocks of a time slot. The processor and the memory may also be configured to communicate information during the time slot via the transceiver according to the symbol allocation.

In some examples, a radio unit may include means for receiving a control message from a network node and means for obtaining at least one symbol mask from the control message. The at least one symbol mask may indicate a symbol allocation within a continuous set of resource blocks of a time slot. The radio unit may also include means for communicating information during the time slot according to the symbol allocation.

In some examples, an article of manufacture for use by a radio unit includes a non-transitory computer-readable medium having stored therein instructions executable by one or more processors of the radio unit to receive a control message from a network node and obtain at least one symbol mask from the control message. The at least one symbol mask may indicate a symbol allocation within a continuous set of resource blocks of a time slot. The computer-readable medium may also have stored therein instructions executable by one or more processors of the user equipment to communicate information during the time slot according to the symbol allocation.

The methods shown in FIGS. 24-26 and 28-30 may include additional aspects, such as any single aspect or any combination of aspects described below and/or in connection with one or more other processes described elsewhere herein. The following provides an overview of several aspects of the present disclosure.

Aspect 1: A method for communication at a scheduling entity, the method comprising: transmitting an indication of a time slot to a radio unit; and transmitting a control message comprising at least one symbol mask for at least one symbol of the time slot and at least one resource element mask for at least one resource element of the time slot to the radio unit.

Aspect 2: The method of aspect 1, wherein the at least one symbol mask indicates at least one modulation compression parameter for the at least one symbol of the time slot.

Aspect 3: The method of aspect 2, wherein the at least one symbol mask comprises: a first symbol mask that specifies a first modulation scaler value for a first set of symbols of the at least one symbol; and a second symbol mask that specifies a second modulation scaler value different from the first modulation scaler value for a second set of symbols of the at least one symbol, wherein the first set of symbols is different from the second set of symbols.

Aspect 4: The method of aspect 3, wherein the control message further comprises: a first section identifier for the first set of symbols; and a second section identifier for the second set of symbols, wherein the first section identifier is different from the second section identifier.

Aspect 5: The method of any of aspects 3 through 4, wherein: the at least one symbol mask comprises a third symbol mask that specifies the first modulation scaler value for the second set of symbols.

Aspect 6: The method of aspect 5, wherein the control message further comprises: a first resource element mask that specifies a plurality of resource elements of the first set of symbols to which the first modulation scaler value is to be applied; a second resource element mask that specifies a first subset of resource elements of the second set of symbols to which the second modulation scaler value is to be applied; and a third resource element mask that specifies a second subset of resource elements of the second set of symbols to which the first modulation scaler value is to be applied, wherein the first subset of resource elements is different from the second subset of resource elements.

Aspect 7: The method of aspect 6, wherein the second resource element mask and the third resource element mask are mutually exclusive.

Aspect 8: The method of any of aspects 3 through 7, wherein: the first modulation scaler value is for a quadrature amplitude modulation (QAM) scheme of a first QAM order, wherein the first QAM order is any QAM order; and the second modulation scaler value is for a phase-shift keying (PSK) modulation QAM scheme of a second QAM order, wherein the second QAM order is any QAM order other than the first QAM order.

Aspect 9: The method of any of aspects 2 through 8, wherein: the control message comprises an open radio access network (ORAN) control plane message; and the ORAN control plane message comprises an application layer section extension that includes the at least one modulation compression parameter.

Aspect 10: The method of aspect 9, wherein the application layer section extension comprises an extension type with: a symbol mask parameter; and an extension type 4 information element, an extension type 5 information element, or a phase tracking reference signal frequency density parameter.

Aspect 11: The method of any of aspects 1 through 10, wherein the at least one symbol mask indicates a symbol allocation within a continuous set of resource blocks of the time slot.

Aspect 12: The method of aspect 11, wherein the at least one symbol mask comprises: a first symbol mask that specifies a first set of symbols for a first allocation of the symbol allocation; and a second symbol mask that specifies a second set of symbols for a second allocation of the symbol allocation, wherein the first set of symbols and the second set of symbols are mutually exclusive.

Aspect 13: The method of aspect 12, wherein the first set of symbols and the second set of symbols are noncontinuous.

Aspect 14: The method of any of aspects 12 through 13, wherein the control message further comprises: a first section identifier for the first set of symbols; and a second section identifier for the second set of symbols, wherein the first section identifier is equal to the second section identifier.

Aspect 15: The method of any of aspects 11 through 14, wherein the symbol allocation identifies symbols of the time slot that are allocated for a user.

Aspect 16: The method of any of aspects 11 through 15, wherein: the control message comprises an open radio access network (ORAN) control plane message; and the ORAN control plane message comprises an application layer section extension for a resource allocation that includes the at least one symbol mask.

Aspect 17: The method of aspect 16, wherein the application layer section extension comprises a phase tracking reference signal frequency density parameter.

Aspect 19: A method for communication at a radio unit, the method comprising: receiving a control message comprising at least one symbol mask for at least one symbol of a time slot and at least one resource element mask for at least one resource element of the time slot; and communicating information during the time slot, wherein the information is communicated according to the at least one symbol mask.

Aspect 20: The method of aspect 19, wherein the at least one symbol mask indicates at least one modulation compression parameter for the at least one symbol of the time slot.

Aspect 21: The method of aspect 20, wherein the at least one symbol mask comprises: a first symbol mask that specifies a first modulation scaler value for a first set of symbols of the at least one symbol; and a second symbol mask that specifies a second modulation scaler value different from the first modulation scaler value for a second set of symbols of the at least one symbol, wherein the first set of symbols is different from the second set of symbols.

Aspect 22: The method of aspect 21, wherein the control message further comprises: a first section identifier for the first set of symbols; and a second section identifier for the second set of symbols, wherein the first section identifier is different from the second section identifier.

Aspect 23: The method of any of aspects 21 through 22, wherein: the at least one symbol mask comprises a third symbol mask that specifies the first modulation scaler value for the second set of symbols.

Aspect 24: The method of any of aspects 21 through 23, wherein: the first modulation scaler value is for a quadrature amplitude modulation (QAM) scheme of a first QAM order; and the second modulation scaler value is for a QAM scheme of a second QAM order that is different from the first QAM order.

Aspect 25: The method of any of aspects 20 through 24, further comprising: using the at least one modulation compression parameter to modulate the information.

Aspect 26: The method of aspect 19, wherein the at least one symbol mask indicates a symbol allocation within a continuous set of resource blocks of the time slot.

Aspect 27: The method of aspect 26, wherein the at least one symbol mask comprises: a first symbol mask that specifies a first set of symbols for a first allocation of the symbol allocation; and a second symbol mask that specifies a second set of symbols for a second allocation of the symbol allocation, wherein the first set of symbols and the second set of symbols are mutually exclusive.

Aspect 28: The method of any of aspects 19 through 27, wherein: the control message comprises an open radio access network (ORAN) control plane message; the ORAN control plane message comprises an application layer section extension for a resource allocation that includes the at least one symbol mask; and the application layer section extension comprises a phase tracking reference signal frequency density parameter.

Aspect 29: The method of any of aspects 19 through 28, wherein the information comprises: a downlink transmission to a user; or an uplink transmission from the user.

Aspect 30: A scheduling entity comprising: a transceiver configured to communicate with a radio access network, a memory, and a processor communicatively coupled to the transceiver and the memory, wherein the processor and the memory are configured to perform any one of aspects 1 through 17.

Aspect 31: An apparatus configured for wireless communication comprising at least one means for performing any one of aspects 1 through 17.

Aspect 32: A non-transitory computer-readable medium storing computer-executable code, comprising code for causing an apparatus to perform any one of aspects 1 through 17.

Aspect 33: A radio unit comprising: a transceiver, a memory, and a processor communicatively coupled to the transceiver and the memory, wherein the processor and the memory are configured to perform any one of aspects 19 through 29.

Aspect 34: An apparatus configured for wireless communication comprising at least one means for performing any one of aspects 19 through 29.

Aspect 35: A non-transitory computer-readable medium storing computer-executable code, comprising code for causing an apparatus to perform any one of aspects 19 through 29.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-30 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in any one or more of FIG. 1, 2, 4-6, 22, 23, or 27 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A network entity, comprising:
one or more memories that store processor-executable code; and
one or more processors configured to execute the processor-executable code and cause the network entity to:
transmit an indication of a time slot to a radio unit; and
transmit a control message comprising at least one symbol mask for at least one symbol of the time slot to the radio unit, wherein the at least one symbol mask comprises:
a first symbol mask that specifies a first modulation scaler value for a first set of symbols of the at least one symbol, and
a second symbol mask that specifies a second modulation scaler value different from the first modulation scaler value for a second set of symbols of the at least one symbol, wherein the first set of symbols is different from the second set of symbols.

2. The network entity of claim 1, wherein the at least one symbol mask indicates at least one modulation compression parameter for the at least one symbol of the time slot.

3. The network entity of claim 1, wherein the control message further comprises:
a first section identifier for the first set of symbols; and
a second section identifier for the second set of symbols, wherein the first section identifier is different from the second section identifier.

4. The network entity of claim 1, wherein:
the at least one symbol mask comprises a third symbol mask that specifies the first modulation scaler value for the second set of symbols.

5. The network entity of claim 4, wherein the control message further comprises:
a first resource element mask that specifies a plurality of resource elements of the first set of symbols to which the first modulation scaler value is to be applied;
a second resource element mask that specifies a first subset of resource elements of the second set of symbols to which the second modulation scaler value is to be applied; and
a third resource element mask that specifies a second subset of resource elements of the second set of symbols to which the first modulation scaler value is to be applied, wherein the first subset of resource elements is different from the second subset of resource elements.

6. The network entity of claim 5, wherein the second resource element mask and the third resource element mask are mutually exclusive.

7. The network entity of claim 1, wherein:
the first modulation scaler value is for a quadrature amplitude modulation (QAM) scheme of a first QAM order, wherein the first QAM order is any QAM order; and
the second modulation scaler value is for a phase-shift keying (PSK) modulation QAM scheme of a second QAM order, wherein the second QAM order is any QAM order other than the first QAM order.

8. The network entity of claim 2, wherein:
the control message comprises an open radio access network (ORAN) control plane message; and
the ORAN control plane message comprises an application layer section extension that includes the at least one modulation compression parameter.

9. The network entity of claim 8, wherein the application layer section extension comprises a type of extension with:
a symbol mask parameter; and
an extension type 4 information element, an extension type 5 information element, or a phase tracking reference signal frequency density parameter.

10. The network entity of claim 1, wherein the at least one symbol mask indicates a symbol allocation within a continuous set of resource blocks of the time slot.

11. The network entity of claim 10, wherein the first set of symbols and the second set of symbols are mutually exclusive.

12. The network entity of claim 10, wherein the first set of symbols and the second set of symbols are noncontinuous.

13. The network entity of claim 10, wherein the control message further comprises:
a first section identifier for the first set of symbols; and a second section identifier for the second set of symbols, wherein the first section identifier is equal to the second section identifier.

14. The network entity of claim 10, wherein the symbol allocation identifies symbols of the time slot that are allocated for a user.

15. The network entity of claim 10, wherein:
the control message comprises an open radio access network (ORAN) control plane message; and
the ORAN control plane message comprises an application layer section extension for a resource allocation that includes the at least one symbol mask.

16. The network entity of claim 15, wherein the application layer section extension comprises a phase tracking reference signal frequency density parameter.

17. A method for communication at a network entity, the method comprising:
transmitting an indication of a time slot to a radio unit; and
transmitting a control message comprising at least one symbol mask for at least one symbol of the time slot to the radio unit, wherein the at least one symbol mask comprises:
a first symbol mask that specifies a first modulation scaler value for a first set of symbols of the at least one symbol, and
a second symbol mask that specifies a second modulation scaler value different from the first modulation scaler value for a second set of symbols of the at least one symbol, wherein the first set of symbols is different from the second set of symbols.

18. A radio unit, comprising:
one or more memories that store processor-executable code; and
one or more processors configured to execute the processor-executable code and cause the radio unit to:
receive a control message, the control message comprising at least one symbol mask for at least one symbol of a time slot, wherein the at least one symbol mask comprises:
a first symbol mask that specifies a first modulation scaler value for a first set of symbols of the at least one symbol, and
a second symbol mask that specifies a second modulation scaler value different from the first modulation scaler value for a second set of symbols of the at least one symbol, wherein the first set of symbols is different from the second set of symbols; and
communicate information during the time slot, wherein the information is communicated according to the at least one symbol mask.

19. The radio unit of claim 18, wherein the at least one symbol mask indicates at least one modulation compression parameter for the at least one symbol of the time slot.

20. The radio unit of claim 18, wherein the control message further comprises:
a first section identifier for the first set of symbols; and
a second section identifier for the second set of symbols, wherein the first section identifier is different from the second section identifier.

21. The radio unit of claim 18, wherein:
the at least one symbol mask comprises a third symbol mask that specifies the first modulation scaler value for the second set of symbols.

22. The radio unit of claim 18, wherein:
the first modulation scaler value is for a quadrature amplitude modulation (QAM) scheme of a first QAM order; and
the second modulation scaler value is for a QAM scheme of a second QAM order that is different from the first QAM order.

23. The radio unit of claim 19, wherein the one or more processors are further configured to execute the processor-executable code and cause the radio unit to:
use the at least one modulation compression parameter to modulate the information.

24. The radio unit of claim 18, wherein the at least one symbol mask indicates a symbol allocation within a continuous set of resource blocks of the time slot.

25. The radio unit of claim 24, wherein the first set of symbols and the second set of symbols are mutually exclusive.

26. The radio unit of claim 18, wherein:
the control message comprises an open radio access network (ORAN) control plane message;
the ORAN control plane message comprises an application layer section extension for a resource allocation that includes the at least one symbol mask; and
the application layer section extension comprises a phase tracking reference signal frequency density parameter.

27. The radio unit of claim 18, wherein the information comprises:
a downlink transmission to a user; or
an uplink transmission from the user.

28. A method for communication at a radio unit, the method comprising:
receiving a control message comprising at least one symbol mask for at least one symbol of a time slot, wherein the at least one symbol mask comprises:
a first symbol mask that specifies a first modulation scaler value for a first set of symbols of the at least one symbol, and
a second symbol mask that specifies a second modulation scaler value different from the first modulation scaler value for a second set of symbols of the at least one symbol, wherein the first set of symbols is different from the second set of symbols; and
communicating information during the time slot, wherein the information is communicated according to the at least one symbol mask.

* * * * *